United States Patent
Wilson

(10) Patent No.: US 9,960,980 B2
(45) Date of Patent: May 1, 2018

(54) LOCATION MONITOR AND DEVICE CLONING

(71) Applicant: Echostar Technologies, LLC, Englewood, CO (US)

(72) Inventor: Daniel Wilson, Acworth, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 46 days.

(21) Appl. No.: 14/832,821

(22) Filed: Aug. 21, 2015

(65) Prior Publication Data

US 2017/0054615 A1   Feb. 23, 2017

(51) Int. Cl.
*G06F 15/173* (2006.01)
*H04L 12/26* (2006.01)
(Continued)

(52) U.S. Cl.
CPC ........ *H04L 43/0817* (2013.01); *H04L 67/125* (2013.01); *H04L 67/18* (2013.01); *H04L 41/0846* (2013.01)

(58) Field of Classification Search
CPC ............. H04L 12/2803; H04L 12/2807; H04L 43/0817; H04L 67/18; H04L 67/125
(Continued)

(56) References Cited

U.S. PATENT DOCUMENTS 4,127,966 A    12/1978 Schmidt
4,386,436 A    5/1983 Kocher et al.
(Continued)

FOREIGN PATENT DOCUMENTS

CA    2 267 988 A1    4/1998
CN    105814555 A    7/2016
(Continued)

OTHER PUBLICATIONS

U.S. Appl. No. 14/470,352, filed Aug. 27, 2014 Non Final Office Action dated Aug. 26, 2016, all pages.
(Continued)

*Primary Examiner* — James E Springer
(74) *Attorney, Agent, or Firm* — Kilpatrick Townsend & Stockton LLP

(57) ABSTRACT

Embodiments described herein provide various techniques for monitoring electronic devices at various locations, and cloning behaviors of specific electronic devices across locations and times. Device monitor and control systems may be configured to detect changes in the operational settings of electronic devices at monitored locations, and to transmit control signals to control corresponding electronic devices at other locations. In some cases, separate device monitor and control systems may operate at different locations, where each system may monitor and control a set of local devices and communicate device status detection signals, control signals, and the like to other device monitor and control systems at other locations. In some examples, central device monitor and control systems may operate at network hubs, such as satellite base stations, cable head-ends, and/or central computer servers, to coordinate the device monitoring and cloning of device behaviors between multiple locations.

15 Claims, 10 Drawing Sheets

(51) Int. Cl.
*H04L 29/08* (2006.01)
*H04L 12/24* (2006.01)

(58) Field of Classification Search
USPC ........................................................ 709/224
See application file for complete search history.

(56) References Cited

U.S. PATENT DOCUMENTS

| | | |
|---|---|---|
| 4,581,606 A | 4/1986 | Mallory |
| 4,694,607 A | 9/1987 | Ishida et al. |
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 * | 9/2004 | Bilger .................... G05B 15/02 700/12 |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |
| 9,286,482 B1 | 3/2016 | Dumont et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 | 9/2017 | McCarthy et al. |
| 9,798,309 B2 | 10/2017 | Tirpak |
| 9,824,578 B2 | 11/2017 | Burton et al. |
| 9,838,736 B2 | 12/2017 | Smith et al. |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |

(56) References Cited

U.S. PATENT DOCUMENTS

| | | |
|---|---|---|
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1* | 8/2006 | Von Gunten ......... G08B 15/002 307/117 |
| 2006/0192680 A1 | 8/2006 | Scuka et al. |
| 2006/0244624 A1* | 11/2006 | Wang ................ H05B 37/0272 340/815.67 |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1* | 6/2010 | Clark ..................... H04L 12/281 700/90 |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1* | 6/2011 | Vinkenvleugel ... H05B 37/0272 340/4.2 |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1 | 9/2012 | Gaines et al. |
| 2012/0271472 A1* | 10/2012 | Brunner ................ G06F 1/3209 700/295 |
| 2012/0271670 A1 | 10/2012 | Zaloom |

(56) References Cited

U.S. PATENT DOCUMENTS

| | | |
|---|---|---|
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1* | 1/2013 | Caceres ............. H04L 12/2803 700/90 |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1* | 1/2014 | Apte ................... H04L 12/2807 709/223 |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1* | 1/2015 | Chen .................. H04L 69/18 315/294 |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1* | 6/2015 | Nye .................... H04L 41/0806 717/178 |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1* | 1/2016 | Linn .................... H04W 4/008 455/41.1 |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1* | 4/2016 | Kim .................... G06F 11/0709 714/47.1 |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |
| 2016/0195856 A1 | 7/2016 | Spero |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |

(56) References Cited

U.S. PATENT DOCUMENTS

| | | | |
|---|---|---|---|
| 2016/0286327 | A1 | 9/2016 | Marten |
| 2016/0323548 | A1 | 11/2016 | Khot et al. |
| 2016/0334811 | A1 | 11/2016 | Marten |
| 2016/0335423 | A1 | 11/2016 | Beals |
| 2016/0338179 | A1* | 11/2016 | Aliakseyeu ........ H05B 37/0245 |
| 2016/0342379 | A1 | 11/2016 | Keipert et al. |
| 2016/0366746 | A1* | 12/2016 | van de Ven ............. F21V 29/74 |
| 2017/0005822 | A1* | 1/2017 | Gao .................... H04L 12/2814 |
| 2017/0006533 | A1* | 1/2017 | Gould ...................... H04L 12/28 |
| 2017/0041886 | A1* | 2/2017 | Baker ................... H04W 4/008 |
| 2017/0048476 | A1* | 2/2017 | Freiin von Kapri . H04N 5/4403 |
| 2017/0051925 | A1 | 2/2017 | Stefanski et al. |
| 2017/0082987 | A1 | 3/2017 | Reddy et al. |
| 2017/0127124 | A9 | 5/2017 | Wilson et al. |
| 2017/0146964 | A1 | 5/2017 | Beals |
| 2017/0168469 | A1 | 6/2017 | Marten et al. |
| 2017/0176961 | A1 | 6/2017 | Tirpak |
| 2017/0187993 | A1 | 6/2017 | Martch et al. |
| 2017/0191693 | A1 | 7/2017 | Bruhn et al. |
| 2017/0191695 | A1 | 7/2017 | Bruhn et al. |
| 2017/0195130 | A1 | 7/2017 | Landow et al. |

FOREIGN PATENT DOCUMENTS

| | | | |
|---|---|---|---|
| EP | 2 736 027 | A1 | 5/2014 |
| EP | 3 080 677 | A1 | 10/2016 |
| EP | 3 080 710 | A1 | 10/2016 |
| GB | 2 304 952 | A | 3/1997 |
| JP | 2008148016 | A | 6/2008 |
| WO | 93/20544 | A1 | 10/1993 |
| WO | WO 2011/149473 | * | 12/2001 ............. H05B 37/02 |
| WO | 2004/068386 | A1 | 8/2004 |
| WO | 2011/095567 | A1 | 8/2011 |
| WO | 2014/068556 | A1 | 5/2014 |
| WO | 2015/179120 | A1 | 11/2015 |
| WO | 2016/034880 | A1 | 3/2016 |
| WO | 2016/066399 | A1 | 5/2016 |
| WO | 2016/066442 | A1 | 5/2016 |
| WO | 2016/182696 | A1 | 11/2016 |
| WO | 2017/116533 | A1 | 7/2017 |

OTHER PUBLICATIONS

U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
International Search Report and Written Opinion for PCT/US2014/053876 dated Nov. 26, 2014, 8 pages.
International Search Report and Written Opinion for PCT/US2014/055441 dated Dec. 4, 2014, 10 pages.
International Search Report and Written Opinion for PCT/US2014/055476 dated Dec. 30, 2014, 10 pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.
"International Building Code Excerpts, Updated with recent code changes that impact electromagnetic locks," Securitron, Assa Abloy, IBC/IFC 2007 Supplement and 2009, "Finally-some relief and clarification", 2 pages. Retrieved from: www.securitron.com/Other/. . . /New_IBC-IFC_Code_Language.pdf.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.

(56) References Cited

OTHER PUBLICATIONS

U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Non Final Office Action dated Nov. 20, 2015, 28 pages.
U.S. Appl. No. 12/700,310, filed Feb. 4, 2010 Final Office Action dated Oct. 26, 2015, 19 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4, 2 pages.

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3, 7 pages.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/GB2015/052457 dated Nov. 13, 2015, 11 pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of European Application No. 15763643.2 as EP 3189511 dated Jul. 12, 2017, 1 page.
Notification of Publication of Brazilian Application No. BR 11 2016 0112032 dated Aug. 8, 2017, 2 pages.
Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.
Mark Edward Soper, "Absolute Beginner's Guide to Home Automation," 2005, Que Publishing, p. 57, 121.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
U.S. Appl. No. 14/981,501, filed Dec. 28, 2015, Final Office Action dated Oct. 10, 2017, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.

(56) References Cited

OTHER PUBLICATIONS

U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/981,501, filed Dec. 28, 2015, Preinterview first office action dated Apr. 20, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/709,791, filed May 12, 2015, Non Final Rejection dated May 31, 2017, all pages.
International Preliminary Report on Patentability for PCT/US2016/028126 dated Nov. 14, 2017, all pages.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/710,331, filed May 12, 2015, Notice of Allowance dated Dec. 7, 2017, all pages.

* cited by examiner

Example Device-to-Device Mapping Table

| Device Monitor Network Address | Controlling Device ID | Device Monitor Network Address | Controlled Device ID |
|---|---|---|---|
| NN-NN-NN-NN-NN-NN | 0001 | MM-MM-MM-MM-MM-MM | 0016 |
| NN-NN-NN-NN-NN-NN | 0003 | MM-MM-MM-MM-MM-MM | 0009 |
| NN-NN-NN-NN-NN-NN | 0003 | MM-MM-MM-MM-MM-MM | 0010 |
| NN-NN-NN-NN-NN-NN | 0003 | LL-LL-LL-LL-LL-LL | 0002 |
| ... | ... | ... | ... |

FIG. 6A

Example Device Characteristic Mapping Table

| Device Monitor Network Address | Controlling Device ID | Device Type | Device Location | Operational Settings |
|---|---|---|---|---|
| NN-NN-NN-NN-NN-NN | 0001 | Interior Light | Interior – Master Bedroom | Off, On |
| NN-NN-NN-NN-NN-NN | 0002 | Interior Light | Interior – Front Living Room | Off, Dim (1/10), Dim (2/10)... |
| NN-NN-NN-NN-NN-NN | 0003 | Interior Light | Interior – Recreation Room | Off, Overhead, Theater, All |
| NN-NN-NN-NN-NN-NN | 0004 | Exterior Light | Exterior – Backdoor | Off, On |
| NN-NN-NN-NN-NN-NN | 0005 | Television | Interior – Recreation Room | Off, On TV, On Audio, ... |
| NN-NN-NN-NN-NN-NN | 0006 | Sprinkler System | Exterior – Front Yard | Off, On |
| NN-NN-NN-NN-NN-NN | 0007 | Window Shade | Interior – Master Bedroom | Down, Low, Mid, High, Up |
| NN-NN-NN-NN-NN-NN | 0008 | Window Shade | Interior – Front Living Room | Down, Up |
| ... | ... | ... | ... | ... |

FIG. 6B

Example Device Usage Pattern Table

900

| Location Monitor Network Address | Controlling Device ID | Day(s) | Time | Operational Setting |
|---|---|---|---|---|
| NN-NN-NN-NN-NN-NN | 0013 | Mon-Fri | 06:35:14 | On |
| NN-NN-NN-NN-NN-NN | 0013 | Mon-Fri | 07:55:20 | Off |
| NN-NN-NN-NN-NN-NN | 0013 | Mon-Fri | 17:22:47 | On |
| NN-NN-NN-NN-NN-NN | 0013 | Mon-Fri | 21:41:33 | Off |
| NN-NN-NN-NN-NN-NN | 0013 | Sat | 09:27:11 | Off |
| NN-NN-NN-NN-NN-NN | 0013 | Sat-Sun | 12:08:28 | On |
| NN-NN-NN-NN-NN-NN | 0013 | Sat-Sun | 14:55:10 | Off |
| ... | ... | ... | ... | ... |

FIG. 9

LOCATION MONITOR AND DEVICE CLONING

BACKGROUND OF THE INVENTION

Locations including residences, businesses, schools, community centers, and other locations often have electronic infrastructures that include various computer systems and other electronic devices. For example, even when such locations are unoccupied, they may have lights, utilities, appliances, equipment, and various other electronic devices which are installed and operational within the interior or exterior of the location. Some locations may be unoccupied or otherwise unused for short or long period of time, such as primary residences during a vacation period, secondary residences during non-vacation periods, stores or office locations during business closures, rental houses or apartments during unoccupied periods of tenancy, etc. When a location is unoccupied or otherwise unused, it may become targets for burglary, vandalism, and other unwanted intrusions. Additionally, various maintenance tasks such as external or interior irrigation tasks, temperature control, plant and animal care tasks, and the like, are often difficult to performance at unoccupied or unused locations.

BRIEF SUMMARY OF THE INVENTION

Aspects described herein provide various techniques for monitoring electronic devices at various locations, and cloning behaviors of specific electronic devices across locations and/or times. In some embodiments, one or more device monitor and control systems may be configured to detect changes in the operational settings of electronic devices at monitored locations such as residences, businesses, and the like, and to transmit control signals to control corresponding electronic devices at other locations. In some cases, separate device monitor and control systems may operate at different locations, where each system may monitor and control a set of local devices and communicate device status detection signals, control signals, and the like to other device monitor and control systems at other locations. Additionally or alternatively, central device monitor and control systems may operate at network hubs, such as satellite base stations, cable head-ends, or central computer servers, to coordinate the device monitoring and cloning of device behaviors between multiple locations. Further, device usage patterns may be detected and used in some embodiments to control a set of controlled electronic devices in the event of power or network outages.

BRIEF DESCRIPTION OF THE DRAWINGS

The present invention is described in conjunction with the appended figures:

FIGS. 6A and 6B are illustrative data tables containing example sets of electronic device mapping data and electronic device characteristic data, according to one or more embodiments of the disclosure.

FIG. 9 is an illustrative data table containing example sets of electronic device usage pattern data, according to one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various techniques (e.g., systems, methods, computer-program products tangibly embodied in a non-transitory computer-readable storage medium, etc.) are described herein for monitoring electronic devices at various locations, and cloning behaviors of specific electronic devices across locations and/or times. In some embodiments, one or more device monitor and control systems may be configured to detect changes in the operational settings of electronic devices at monitored locations such as residences, businesses, and the like, and to transmit control signals to control corresponding electronic devices at other locations. In some cases, separate device monitor and control systems may operate at different locations, where each system may monitor and control a set of local devices and communicate device status detection signals, control signals, and the like to other device monitor and control systems at other locations. Additionally or alternatively, central device monitor and control systems may operate at network hubs, such as satellite base stations, cable head-ends, or central computer servers, to coordinate the device monitoring and cloning of device behaviors between multiple locations.

The various embodiments described herein may be implemented on and within one or more different network systems, including satellite or terrestrial television distribution systems, telecommunications network systems, computer networks data such as the Internet, cellular and other mobile networking systems, and the like. Therefore, although certain examples below are described in terms of a specific network system (e.g., a satellite television distribution system) and specific user equipment (e.g., television receivers, set-top boxes, remote controls, etc.), it should be understood that similar or identical embodiments may be implemented using other network systems and architectures (e.g., cable television networks, telecommunication networks, computer networks), as well as other user equipment and devices (e.g., servers, routers, firewalls, gaming consoles, personal computers, smartphones, etc.).

Figure 1:
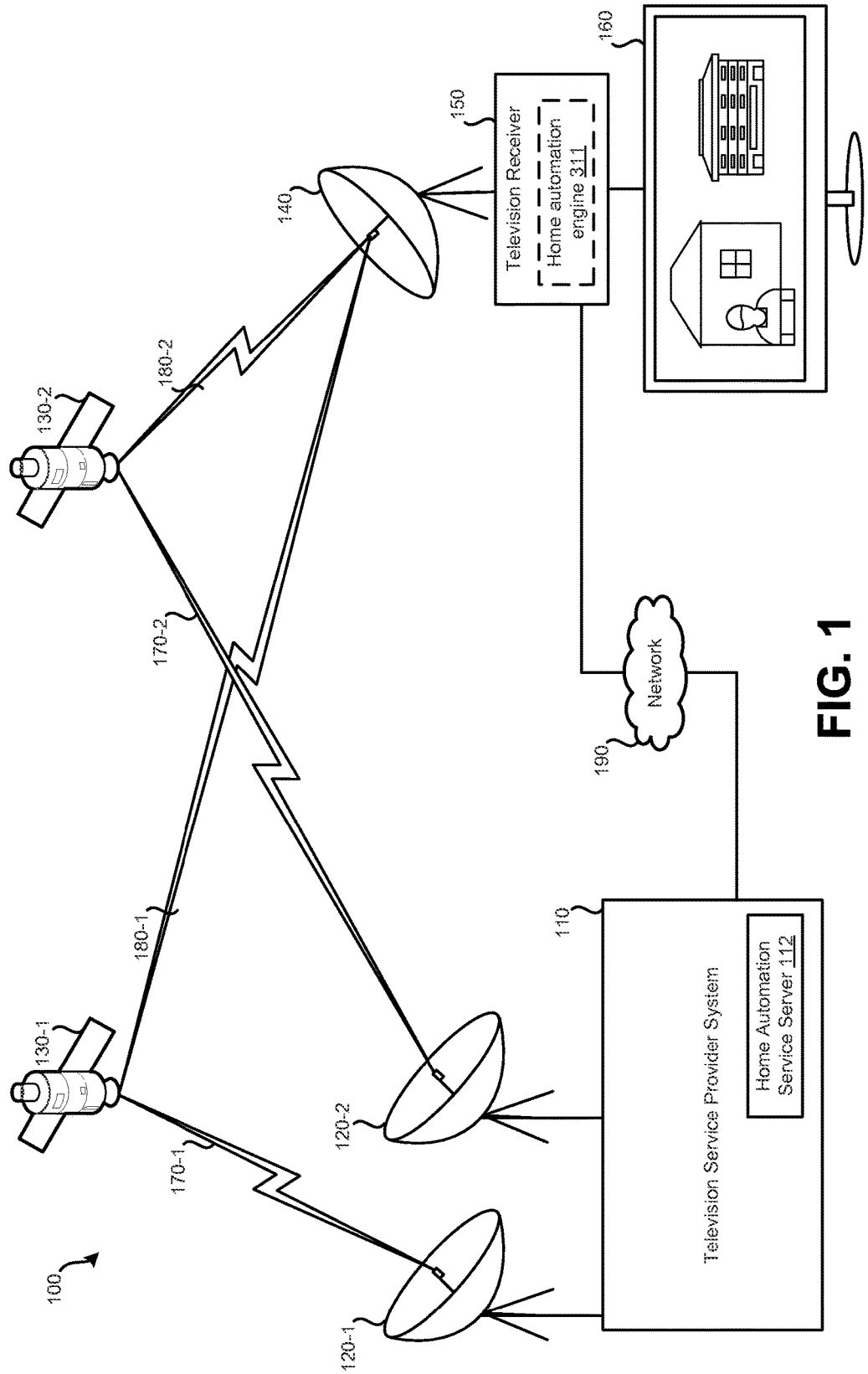
FIG. 1 is a block diagram illustrating an embodiment of a television service provider system, according to one or more embodiments of the disclosure.

Referring now to FIG. 1, an illustrative embodiment of a satellite television distribution system 100 is shown which may be used to implement certain embodiments described herein. While a home automation system may be incorporated with various types of television receivers, various embodiments may be a part of a satellite-based television distribution system. Cable, IP-based, wireless and broadcast focused systems are also possible. Satellite television distribution system 100 may include: television service provider system 110, satellite transmitter equipment 120, satellites 130, satellite dish 140, television receiver 150, home automation service server 112, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

As shown in FIG. 1, television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Still referring to FIG. 1, satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions also may be relayed to television receiver via one or more transponder streams. For instance, home automation functions may be requested by and/or pushed to the television receiver 150 from the television service provider system 110.

As shown in FIG. 1, multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Further, it is contemplated that multiple home automation functions may be transmitted in similar fashion.

Still in reference to FIG. 1, satellite dish 140 may be a piece of user equipment that is used to receive transponder streams from one or more satellites, such as satellites 130. Satellite dish 140 may be provided to a subscriber for use on a subscription basis to receive television channels and/or home automation functions provided by the television service provider system 110 and/or specifically, the home automation service server 112 of the provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time. Merely by way of example, multiple television channels and/or multiple home automation functions may be received concurrently.

Figure 2:
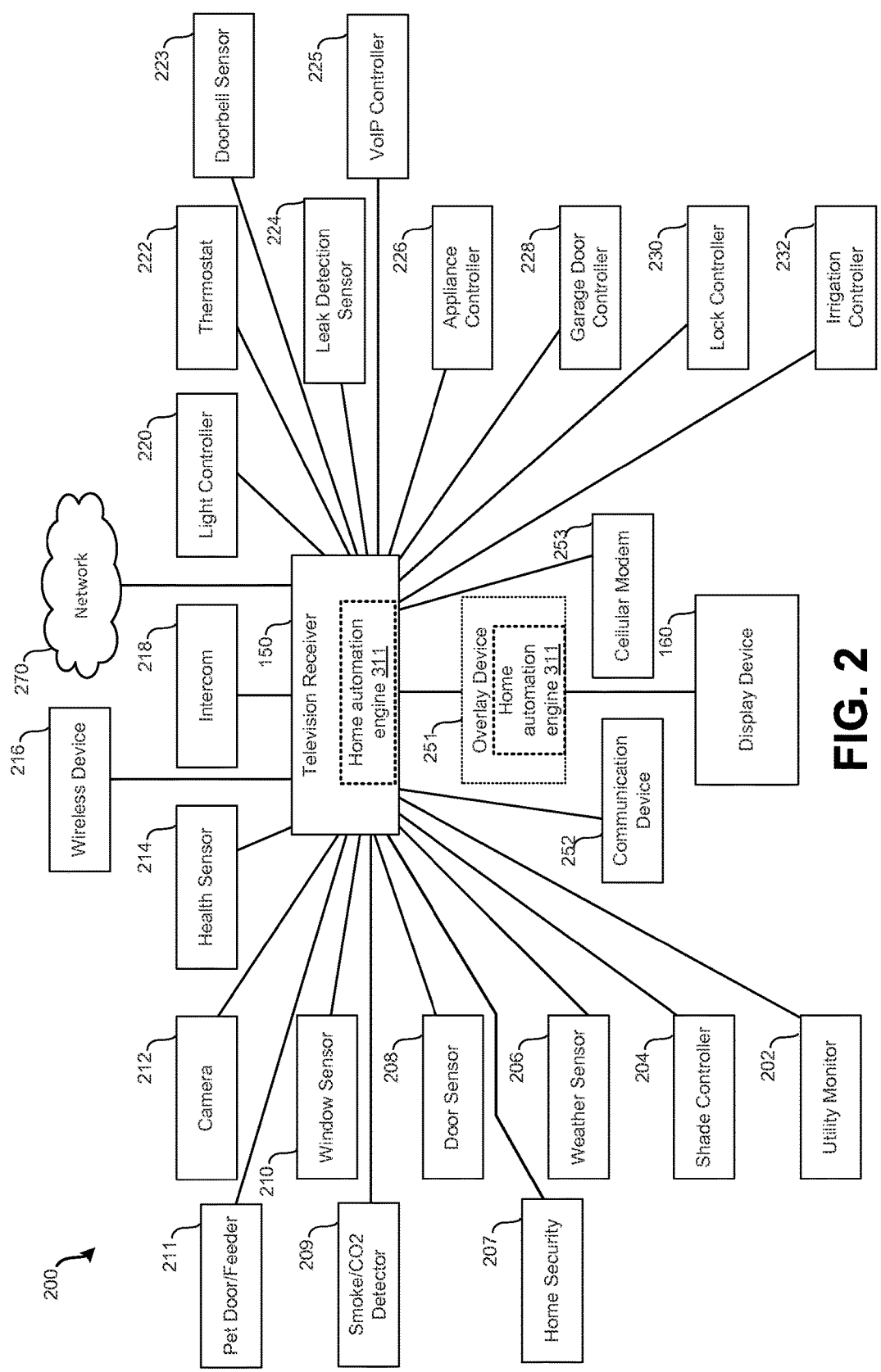
FIG. 2 illustrates an example of a home automation system hosted by a television receiver, according to one or more embodiments of the disclosure.

FIG. 1 further illustrates one or more television receivers in communication with satellite dish 140. Television receivers may be configured to decode signals received from satellites 130 via satellite dish 140 for output and presentation via a display device, such as display device 160. Similarly, such television receivers may decode signals received for any home automation devices. For instance, a home automation engine 311, as described further below, may decode such signals. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 described below provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include the home automation engine 311, as detailed in relation to FIG. 3.

Referring again to FIG. 1, display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

As further illustrated in FIG. 1, uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and/or home automation functions. For example, uplink signal 170-1 may contain a first group of television channels and/or home automation functions, while uplink signal 170-2 contains a second group of television channels and/or home automation functions. Each of these television channels and/or home automation functions may be scrambled such that unauthorized persons are prevented from accessing the television channels.

As shown in FIG. 1, downlink signal 180-1 represents a signal between satellite 130-1 and satellite dish 140. Downlink signal 180-2 represents a signal between satellite 130-2 and satellite dish 140. Each of the downlink signals 180 may contain one or more different television channels and/or home automation functions, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels and/or home automation functions, while downlink signal 180-2 may be a second transponder stream containing a different group of television channels and/or home automation functions. In addition to or instead of containing television channels, a transponder stream can be used to transmit on-demand content to television receivers, including PPV content (which may be stored locally by the television receiver until output for presentation).

FIG. 1 further illustrates downlink signal 180-1 and downlink signal 180-2, being received by satellite dish 140 and distributed to television receiver 150. For a first group of television channels and/or home automation functions, satellite dish 140 may receive downlink signal 180-1 and for a second group of channels and/or home automation functions, downlink signal 180-2 may be received. Television receiver 150 may decode the received transponder streams. As such, depending on which television channels and/or home automation functions are desired to be presented or stored, various transponder streams from various satellites may be received, descrambled, and decoded by television receiver 150.

Further shown in FIG. 1, network 190, which may include the Internet, may allow for bidirectional communication between television receiver 150 and television service provider system 110, such as for home automation related services provided by home automation service server 112. In addition or in alternate to network 190, a telephone (e.g., landline) or cellular connection may be used to enable communication between television receiver 150 and television service provider system 110.

Referring now to FIG. 2, an embodiment of a home automation system 200 hosted by a television receiver is illustrated. Television receiver 150 may represent the television receiver of FIG. 1. While television receiver 150 may be configured to receive television programming from a satellite-based television service provider, it should be understood that in other embodiments, other forms of television service provider networks may be used, such as an IP-based network (e.g., fiber network), a cable based network, a wireless broadcast-based network, as well as any other terrestrial, atmospheric (e.g., drone-based or balloon-based), or satellite network.

As shown in FIG. 2, television receiver 150 may be configured to communicate with multiple in-home home automation devices. The devices with which television receiver 150 communicates may use different communication standards or protocols. For instance, one or more devices may use a ZigBee® communication protocol while one or more other devices communicate with the television receiver using a Z-Wave® communication protocol. Other forms of wireless communication may be used by devices and the television receiver 150. For instance, television receiver 150 and one or more devices may be configured to communicate using a wireless local area network, which may use a communication protocol such as 802.11.

Referring to FIG. 2, in some embodiments, a separate device may be connected with television receiver 150 to enable communication with home automation devices. For instance, communication device 252 may be attached to television receiver 150. Communication device 252 may be in the form of a dongle. Communication device 252 may be configured to allow for Zigbee®, Z-Wave®, and/or other forms of wireless communication. The communication device may connect with television receiver 150 via a USB port or via some other type of (wired) communication port. Communication device 252 may be powered by the television receiver 150 or may be separately coupled with a power source. In some embodiments, television receiver 150 may be enabled to communicate with a local wireless network and may use communication device 252 in order to communicate with devices that use a ZigBee® communication protocol, Z-Wave® communication protocol, and/or some other home wireless communication protocols.

Still referring to FIG. 2, communication device 252 may also serve to allow additional components to be connected with television receiver 150. For instance, communication device 252 may include additional audio/video inputs (e.g., HDMI), component, and/or composite input to allow for additional devices (e.g., Blu-ray players) to be connected with television receiver 150. Such connection may allow video from such additional devices to be overlaid with home automation information. Merely by way of example, whether home automation information is overlaid onto video may be triggered based on a user's press of a remote control button.

As shown in FIG. 2, regardless of whether television receiver 150 uses communication device 252 to communicate with home automation devices, television receiver 150 may be configured to output home automation information for presentation to a user via display device 160. Such information may be presented simultaneously with television programming received by television receiver 150, such as via system 100 of FIG. 1 described above. Television receiver 150 may also, at a given time, output only television programming or only home automation information based on a user's preference. The user may be able to provide input to television receiver 150 to control the home automation system hosted by television receiver 150 or by overlay device 251, as detailed below.

Still referring to FIG. 2, in some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 251. Overlay device 251 may be configured to overlay information, such as home automation information, onto a signal to be visually presented via display device 160, such as a television. In some embodiments, overlay device 251 may be coupled between television receiver 150, which may be in the form of a set top box, and display device 160, which may be a television. In such embodiments, television receiver 150 may receive, decode, descramble, decrypt, store, and/or output television programming and/or home automation functions. Television receiver 150 may output a signal, such as in the form of an HDMI signal. Rather than be directly input to display device 160, the output of television receiver 150 may be input to overlay device 251. Overlay device 251 may receive the video and/or audio output from television receiver 150. Overlay device 251 may add additional information to the video, audio and/or home automation function signal received from television receiver 150. The modified video and/or audio signal may be output to display device 160 for presentation. In some embodiments, overlay device 251 has an HDMI input and an HDMI output, with the HDMI output being connected to display device 160. To be clear, while FIG. 2 illustrates lines illustrating communication between television receiver 150 and various devices, it should be understood that such communication may exist, in addition or in alternate via communication device 252 and/or with overlay device 251.

Referring again to FIG. 2, in some embodiments, television receiver 150 may be used to provide home automation functionality while overlay device 251 may be used to present information via display device 160. It should be understood that the home automation functionality detailed herein in relation to a television receiver may alternatively be provided via overlay device 251. In some embodiments, overlay device 251 may provide home automation functionality and be used to present information via display device 160. Using overlay device 251 to present automation information via display device 160 may have additional benefits. For instance, multiple devices may provide input video to overlay device 251. For instance, television receiver 150 may provide television programming to overlay device 251, a DVD/Blu-Ray player may provide video overlay device 251, and a separate internet-TV device may stream other programming to overlay device 251. Regardless of the source of the video/audio, overlay device 251 may output video and/or audio that has been modified to include home automation information, such as a pop-up overlay with a prompt message, and output to display device 160. As such, in such embodiments, regardless of the source of video/audio, overlay device 251 may modify the audio/video to include home automation information and, possibly, solicit for user input. For instance, in some embodiments overlay device 251 may have four video inputs (e.g., four HDMI inputs) and a single video output (e.g., an HDMI output). In other embodiments, such overlay functionality may be part of television receiver 150. As such, a separate device, such as a Blu-ray player may be connected with a video input of television receiver 150, thus allowing television receiver 150 to overlay home automation information when content from the Blu-Ray player is being output to display device 160.

Still referring to FIG. 2, regardless of whether television receiver 150 is itself configured to provide home automation functionality and output home automation input for display via display device 160 or such home automation functionality is provided via overlay device 251, home automation information may be presented by display device 160 while television programming is also being presented by display device 160. For instance, home automation information may be overlaid or may replace a portion of television programming (e.g., broadcast content, stored content, on-demand content, etc.) presented via display device 160. Merely by way of example, while television programming is being presented (e.g., a television show on scuba diving), the display is augmented with information related to home automation. This television show may represent broadcast programming, recorded content, on-demand content, or some other form of content. In one example, the presented home automation information is related to motion being detected by a camera at a front door of a location. Such augmentation of the television programming may be performed directly by television receiver 150 (which may or may not be in communication with communication device 252) or overlay device 251 connected with television receiver 150 and display device 160. Such augmentation may result in solid or partially transparent graphics being overlaid onto television programming (or other forms of video) output by television receiver 150. Overlay device 251 or television receive 150 may be configured to add or modify sound to television programming. In addition or in alternate, a graphic may be displayed. In other embodiments, camera data (e.g., nanny camera data) and/or associated sound or motion sensors may be integrated in the system and overlaid or otherwise made available to a user.

Still in reference to FIG. 2, such presented home automation information may request user input. For instance, a user, via controls of television receiver 150 (e.g., a remote control) or controls of overlay device 251, can specify whether video from a camera at the front door should be presented, not presented, or if future notifications related to such motion such be ignored. If ignored, this may be for a predefined period of time, such as an hour, or until the television receiver 150 or overlay device 251 is powered down and powered back on. Ignoring of video may be particularly useful if motion or some other event is triggering the presentation of video that is not interesting to a viewer of display device 160 (or a wireless device).

As shown in FIG. 2, television receiver 150 or overlay device 251 may be configured to communicate with one or more wireless devices, such as wireless device 216. Wireless device 216 may represent a tablet computer, cellular phone, laptop computer, remote computer, or some other device through which a user may desire to control home automation settings and view home automation information. Such a device also need not be wireless, such as a desktop computer. Television receiver 150, communication device 252, or overlay device 251 may communicate directly with wireless device 216, or may use a local wireless network, such as network 270. Wireless device 216 may be remotely located and not connected with a same local wireless network. Via the internet, television receiver 150 or overlay device 251 may be configured to transmit a notification to wireless device 216 regarding home automation information. For instance, in some embodiments, a third-party notification server system, such as the notification server system operated by Apple®, may be used to send such notifications to wireless device 216.

Further shown in FIG. 2, in some embodiments, a location of wireless device 216 may be monitored. For instance, if wireless device 216 is a cellular phone, when its position indicates it has neared a door, the door may be unlocked. A user may be able to define which home automation functions are controlled based on a position of wireless device 216. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 150.

Still referring to FIG. 2, in some embodiments, little to no setup of network 270 may be necessary to permit television receiver 150 to stream data out to the Internet. For instance, television receiver 150 and network 270 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Still referring to FIG. 2, as an example of how wireless device 216 may be used in conjunction with television receiver 150 or overlay device 251 for controlling a home automation system, a wireless device 216 may be in communication with television receiver 150 serving as the host of a home automation system. At approximately a same time that the home automation information is presented via display device 160 (assuming it is turned on), similar information may be sent to wireless device 216, such as via a third-party notification server or directly from television receiver 150 or overlay device 251 via a local wireless network. A user of wireless device 216 can specify whether video from a camera at the front door should be presented by wireless device 216, not presented, or if future notifications related to such motion should be ignored. If ignored, this may be for a predefined period of time, such as an hour or some other predefined or user-selected period of time. In this way, a user interface of the wireless device 216 may correspond to an overlay of the home automation information and/or prompt appearing on the display device 160.

Referring again to FIG. 2, wireless device 216 may serve as an input device for television receiver 150. For instance, wireless device 216 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device, such as lighting commands, security alarm settings and door lock commands. While wireless device 216 may be used as the input device for typing text, television receiver 150 may output for display text to display device 160.

Still referring to FIG. 2, wireless device 216 may be configured to store a software model of home automation system intended to mirror the software model stored by television receiver 150, which is hosting the home automation system. For instance, such a software model may allow wireless device 216 to view, communicate with, and/or interact with various home automation devices. Such a software model may indicate the state of various home automation devices. When wireless device 216 is not in communication with television receiver 150, changes to the home automation model made at television receiver 150 may not be known to wireless device 216. A history list maintained by television receiver 150 and/or a synchronization point numerical value, whereby each change to the home automation model by television receiver 150 is assigned a value and synchronized at a later point with the wireless device 216, may be implemented. In another aspect, the wireless device 216 may be utilized by a user for entering and/or confirming rules and other settings of the home automation system, and such settings may be synchronized or otherwise communicated with the television receiver 150.

Further shown in FIG. 2, in some embodiments, a cellular modem 253 may be connected with either overlay device 251 or television receiver 150. Cellular modem 253 may be useful if a local wireless network is not available. For instance, cellular modem 253 may permit access to the internet and/or communication with a television service provider. Communication with a television service provider, such as television service provider system 110 of FIG. 1, may also occur via a local wireless or wired network connected with the Internet. In some embodiments, information for home automation purposes may be transmitted by television service provider system 110 to television receiver 150 or overlay device 251 via the television service provider's distribution network, which may include the use of satellites 130.

As shown in FIG. 2, various home automation devices may be in communication with television receiver 150 or overlay device 251. Such home automation devices may use disparate communication protocols. Such home automation devices may communicate with television receiver 150 directly or via communication device 252. Such home automation devices may be controlled by a user and/or have a status viewed by a user via display device 160 and/or wireless device 216. Such home automation device may include one or more of the following, as discussed below.

As shown in FIG. 2, such home automation devices may include one or more cameras, such as camera 212. Camera 212 may be either indoors or outdoors and may provide a video and, possibly, audio stream which can be presented via wireless device 216 and/or display device 160. Video and/or audio from camera 212 may be recorded by overlay device 251 or television receiver 150 upon an event occurring, such as motion being detected by camera 212. Video and/or audio from camera 212 may be continuously recorded such as in the form of a rolling window, thus allowing a period of time of video/audio to be reviewed by a user from before a triggering event and after the triggering event. Video may be recorded on a storage local to overlay device 251 or television receiver 150, or may be recorded and or storage on external storage devices, such as a network attached storage device. In some embodiments, video may be transmitted across the local and/or wide area network to other storage devices upon occurrence of a trigger event for later playback. For initial setup, a still from camera 212 may be captured by and stored by television receiver 150 for subsequent presentation as part of a user interface via display device 160 such that the user can determine which camera (if multiple cameras are present) is being set up and/or later accessed.

For instance, as shown in FIG. 2, video and, possibly, audio from camera 212 may be available live for viewing by a user via overlay device 251 or television receiver 150. Such video may be presented simultaneously with television programming being presented. In some embodiments, video may only be presented if motion is detected by camera 212, otherwise video from camera 212 may not be presented by the display device presenting television programming. Also, such video (and, possibly, audio) from camera 212 may be recorded by television receiver 150 or overlay device 251. Such video may be recorded based upon a timer configured by a user. For instance, camera 212 may be incorporated into an electronic programming guide (EPG) output for display by television receiver 150. For instance, camera 212 may be presented as a "channel" as part of the EPG along with other television programming channels. A user may be permitted to select the channel associated with camera 212 for presentation via display device 160 (or wireless device 216). The user may also be permitted to set a timer to record the channel of camera 212 for a user-defined period of time on a user-defined date. Such recording may not be constrained by the rolling window associated with a triggering event being detected. In some embodiments, video from camera 212 may be backed up to a remote storage device, such as cloud-based storage hosted by home automation service server 112. Other data may also be cached to the cloud, such as configuration settings. Thus, if the television receiver 150 or overlay device 251 malfunctions, then a new device may be installed and the configuration data loaded onto the device from the cloud.

Further shown in FIG. 2, window sensor 210 and door sensor 208 may transmit data to television receiver 150 (possibly via communication device 252) or overlay device 251 that indicates the status of a window or door, respectively. Such status may indicate open or closed. When a status change occurs, the user may be notified as such via wireless device 216 or display device 160. Further, a user may be able to view a status screen to view the status on one or more window sensors and/or one or more door sensors throughout the location. Window sensor 210 and/or door sensor 208 may have integrated glass break sensors to determine if glass has been broken.

Still shown in FIG. 2, one or more smoke and/or $CO_2$ detectors 209 may be integrated as part of a home automation system. As such, alerts as to whether a fire or $CO_2$ has been detected can be sent to television receiver 150, wireless device 216, and/or emergency first responders. Further, television receiver 150 and/or wireless device 216 may be used to disable false alarms. One or more sensors may be integrated or separate to detect gas leaks, radon, or various other dangerous situations.

Still referring to FIG. 2, pet door and/or feeder 211 may allow for pet related functionality to be integrated with television receiver 150. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door via wireless device 150 and/or wireless device 216.

Still shown in FIG. 2, weather sensor 206 may allow television receiver 150 or overlay device 251 to receive, identify, and/or output various forms of environmental data, including temperature, humidity, wind speed, barometric pressure, etc. Television receiver 150 or overlay device 251 may allow for control of one or more shades, such as window, door, and/or skylight shades, within a house. Shade controller 204 may respond to commands from television receiver 150 or overlay device 251 and may provide status updates (e.g., shade up, shade 50% up, shade down, etc.).

As shown in FIG. 2, in some embodiments, television receiver 150 may receive and notify a user of the status of electrical appliances such as refrigerators and dishwashers within the house. The television receiver 150 may be linked to the appliances and present a notification message to the user through any device that the user is using at the time, such as a tablet computer, mobile phone or thin client. U.S. patent application Ser. No. 12/700,310, filed Feb. 4, 2010, entitled "Electronic Appliance Status Notification via a Home Entertainment System", which is hereby incorporated by reference, describes such techniques in further detail.

Also shown in FIG. 2, utility monitor 202 may serve to provide television receiver 150 or overlay device 251 with utility information, such as electricity usage, gas usage, water usage, wastewater usage, irrigation usage, etc. A user may view a status page or may receive notifications upon predefined events occurring, such as electricity usage exceeding a defined threshold within a month, or current kilowatt usage exceeding a threshold.

FIG. 2 further shows a health sensor 214 that may permit a user's vital characteristics to be monitored, such as a heart rate. In some embodiments, additionally or alternatively, health sensor 214 may contain a button or other type of actuator that a user can press to request assistance. As such, health sensor 214 may be mounted to a fixed location, such as bedside, or may be carried by a user, such as on a lanyard. Such a request may trigger a notification to be presented to other users via display device 160 and/or wireless device 216. Additionally or if the notification is not cleared by another user within a predefined period of time, a notification may be transmitted to emergency first responders to request help. In some embodiments, a home automation service provider may first try contacting the user, such as via phone, to determine if an emergency is indeed occurring. Such a health sensor 214 may have additional purposes, such as for notification of another form of emergency, such as a break-in, fire, flood, theft, disaster, etc. In some examples, the health sensor 214 may receive signals from various cameras, temperature sensors, and other monitoring equipment in connection with the home automation system, analyze such signals, and store or report such signals as necessary.

Still referring to FIG. 2, in some embodiments, health sensor 214 may be used as a medical alert pendant that can be worn or otherwise carried by a user. It may contain a microphone and/or speaker to allow communication with other users and/or emergency first responders. Television receiver 150 or overlay device 251 may be preprogrammed to contact a particular phone number (e.g., emergency service provider, relative, caregiver, etc.) based on an actuator of health sensor 214 being activated by a user. The user may be placed in contact with a person via the phone number and the microphone and/or speaker of health sensor 214. Camera data may be combined with such alerts in order to give a contacted relative more information regarding the medical situation. For example, health sensor 214, when activated in the family room, may generate a command which is linked with security camera footage from the same room. In some embodiments, health sensor 214 may be able to monitor vitals of a user, such as a blood pressure, temperature, heart rate, blood sugar, etc. In some embodiments, an event, such as a fall or exiting a structure can be detected. Further, parallel notifications may be sent by the health sensor 214 to multiple user devices at approximately the same time. As such, multiple people can be made aware of the event at approximately the same time (as opposed to serial notification). Which users are notified for which type of event may be customized by a user of television receiver 150.

Further in reference to FIG. 2, in addition to such parallel notifications being based on data from health sensor 214, data from other devices may trigger such parallel notifications according to various rules within the home automation system. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications. A configuring user may be able to select whom to notify from a list of users provided by the home automation system and to select a method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be 1) SMS Message, 2) push notification, 3) electronic voice recorder places call to primary number, and 4) electronic voice recorder places call to spouse's number. The second notification may never happen if the user replies to the SMS message with an acknowledgment. Or, the second notification would automatically happen if the SMS gateway cannot be contacted.

Referring again to FIG. 2, intercom 218 may permit a user in one location to communicate with a user in another location, who may be using wireless device 216, display device 160 or some other device, such another television receiver within the structure. Intercom 218 may be integrated with camera 212 or may use a dedicated microphone/speaker, such as a Bluetooth® microphone. Microphones/speakers of wireless device 216, display device 160, communication device 252, and/or overlay device 251 may also or alternatively be used. A multimedia over coax (MOCA) network or other appropriate type of network may be used to provide audio and/or video based intercom via television receiver 150 with other television receivers and/or wireless devices in communication with television receiver 150. Similarly, video and/or audio conferencing can be provided, such that communication with persons via the Internet is possible. Therefore, one possible use would be video and/or audio conferencing within a structure using each television receiver (and associated connected display devices) in the structure that are in communication, or allowing each television receiver to perform video/audio conferencing with other devices external to the structure or local area network.

Referring to FIG. 2, to enable intercom 218, a microphone may be placed in a location where a user would typically be using intercom 218. For instance, a microphone may be placed near display device 160. In some embodiments, a microphone may be integrated into a remote control of television receiver 150. As such, if a user is using television receiver 150 via remote control, the user would have access to a microphone. In at least one embodiment, a user can leverage the wireless device 216, such as a mobile phone or tablet computer, as the microphone for the home automation system.

Referring again to FIG. 2, doorbell sensor 223 may permit an indication of when a doorbell has been rung to be sent to multiple devices, such as television receiver 150 and/or wireless device 216. In some embodiments, doorbell sensor 223 detecting a doorbell ring may trigger video to be recorded by camera 212 of the area near the doorbell and the video to be stored until deleted by a user (or stored for predefined period of time).

Further, as shown in FIG. 2, such a microphone, or a microphone on one or more other home automation devices, may allow for voice recognition to be performed by television receiver 150. Voice recognition may allow for a particular user to be determined and for commands to be completed based on a user speaking such commands. For instance, an adult user may be permitted to perform certain functions that a child user cannot; such as unlocking doors. Each user may provide a voice sample which is used by television receiver 150 to distinguish users from each other. Further, users may be able to speak commands, such as "lower heat 5 degrees," to control home automation devices. Based on the command received, television receiver 150 may determine to which home automation device the command is intended and may transmit an appropriate command (such as, in this example, a command to lower the heat setting by five degrees to thermostat 222). In at least one embodiment, a user may use a user-defined code word that precedes or follows a command, such as "sesame," then speaking a command such as "turn on the living room lights." In some embodiments, in addition or in alternate to voice identification, fingerprint identification may be used to determine an identity of a user. Specific functions of television receiver 150 may require that a user log in, such as via a fingerprint scanner, before being able to view and/or modify such functions.

Referring to FIG. 2, light controller 220 may permit a light to be turned on, off, and/or dimmed by television receiver 150 or overlay device 251 (such as based on a user command received via wireless device 216 or directly via television receiver 150 or overlay device 251). Light controller 220 may control a single light. As such, multiple different light controllers 220 may be present within a house.

In some embodiments, a physical light switch (which opens and closes a circuit of the light) may be left in the on position such that light controller 220 can be used to control whether the light is on or off Light control 220 may be integrated into a light bulb or into a circuit (such as between the light fixture and the power source) to control whether the light is on or off. The user, via television receiver 150 or overlay device 251 may be permitted to view a status of all light controllers 220 within a location. Since television receiver 150 or overlay device 251 may communicate using different home automation protocols, different light controllers 220 (and, more generally, different home automation devices) within a location may use disparate communication protocols, but may all still be controlled by television receiver 150 or overlay device 251. In some embodiments, wireless light switches may be used that communicate with television receiver 150 or overlay device 251. Such switches may use a different communication protocol than light controllers 220. Such a difference may not affect functionality because television receiver 150 or overlay device 251 can serve as a hub for multiple disparate communication protocols and perform any necessary translation and/or bridging functions. For example, a tablet computer may transmit a command over a WiFi connection and television receiver 150 or overlay device 251 may translate the command into an appropriate Zigbee or Zwave command for a wireless light bulb. In some embodiments, the translation may occur for a group of disparate devices. For example, a user decides to turn off all lights in a room and selects a lighting command on the tablet computer. The overlay device 251 identifies the lights in the room and outputs appropriate commands to all devices over different protocols, such as a Zigbee wireless lightbulb and a Zwave table lamp. Television receiver 150 may permit timers and/or dimmer settings to be set for lights via light controller 220. For instance, lights can be configured to turn on/off at various times during a day according to a schedule (and/or events being detected by the home automation system).

Referring again to FIG. 2, thermostat 222 may communicate with television receiver 150 or overlay device 251. Thermostat 222 may provide heating/cooling updates on the location to television receiver 150 or overlay device 251 for display via display device 160 and/or wireless device 216. Further, control of thermostat 222 may be effectuated via television receiver 150 or overlay device 251. Zone control within a structure using multiple thermostats may also be possible.

Leak detection sensor 224 of FIG. 2 may be in communication with television receiver 150 or overlay device 251 and may be used to determine when a water leak has occurred, such as in pipes supplying water-based fixtures with water. Leak detection sensor 224 may be configured to attach to the exterior of a pipe and listen for a sound of water moving within a pipe. In other embodiments, sonar, temperature sensors or ion infused water with appropriate sensors may be used to detect moving water. As such, cutting or otherwise modifying plumbing may not be necessary to use leak detection sensor 224. If water movement is detected for greater than a threshold period of time, it may be determined that a leak is occurring. Leak detection sensor 224 may have a component that couples over an existing valve such that the flow of water within one or more pipes can be stopped. For instance, if leak detection sensor 224 determines a leak may be occurring, a notification may be provided to a user via wireless device 216 and/or display device 160 by television receiver 150 or overlay device 251. If a user does not clear the notification, the flow of water may be shut off by leak detection sensor 224 after a predefined period of time. A user may also be able to provide input to allow the flow of water to continue or to immediately interrupt the flow of water.

Further shown in FIG. 2, VoIP (voice over IP) controller 225 may permit television receiver 150 to serve as a hub for a home phone system. One or more conventional telephones may be connected with television receiver 150. Calls may be converted to IP by television receiver 150, which may further allow for calls to be received and placed via network 270 that is connected with the Internet. The need for a dedicated home phone line may thus be eliminated. In some embodiments, a cellular back channel (e.g., via a cellular modem) may be utilized as a backup to other types of internet connections, such as DSL, cable modems or satellite internet.

Appliance controller 226 of FIG. 2 may permit a status of an appliance to be retrieved and commands to control operation to be sent to an appliance by television receiver 150 or overlay device 251. For instance, appliance controller 226 may control a washing machine, a dryer, a dishwasher, an oven, a microwave, a refrigerator, a toaster, a coffee maker, a hot tub, or any other form of appliance. Appliance controller 226 may be connected with the appliance or may be integrated as part of the appliance.

Appliances and other electronic devices may also be monitored for electricity usage. For instance, US Pat. Pub. No. 2013/0318559, filed Nov. 19, 2012, to Crabtree, entitled "Apparatus for Displaying Electrical Device Usage Information on a Television Receiver," which is hereby incorporated by reference, may allow for information regarding the electricity usage of one or more devices (e.g., other home automation devices or circuits within a home that are monitored) to be determined. Control of one or more home automation devices may be dependent on electrical usage and stored electrical rates. For instance, a washing machine may be activated in the evening when rates are lower. Additionally or alternatively, operation of devices may be staggered to help prevent consuming too much power at a given time. For instance, an electric heater may not be activated until a dryer powered via the same circuit is powered down.

Garage door controller 228 of FIG. 2 may permit a status of a garage door to be checked and the door to be opened or closed by a user via television receiver 150 or overlay device 251. In some embodiments, based on a location of wireless device 216, the garage door may be controlled. For instance, if wireless device 216 is a cellular phone and it is detected to have moved a threshold distance away from a house having garage door controller 228 installed, a notification may be sent to wireless device 216. If no response is received within a threshold period of time, the garage may be automatically shut. If wireless device 216 moves within a threshold distance of garage door controller 228, the garage may be opened.

Lock controller 230 of FIG. 2 may permit a door to be locked and unlocked and/or monitored by a user via television receiver 150 or overlay device 251. In some embodiments, lock controller 230 may have an integrated door sensor 208 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, lock controller 230 may have an integrated door sensor 208 that allows for the single lock controller 230 to lock/unlock a door and provide a status as to whether the door is open or shut. Therefore, a single device may control a lock and determine whether the associated door is shut or open. Such a single device may have a single power source that allows for sensing of the lock position, sensing of the door position, and for engagement/disengagement of the lock. Lock controller 230 may have an integrated door sensor that includes a reed switch or proximity sensor that detects when the door is in a closed position. Other forms of sensing may also be used, such as a proximity sensor to detect a doorframe.

A home security system 207 of FIG. 2 may be integrated with a home automation system. The home security system 207 may detect motion, when a user has armed/disarmed the home security system 207, when windows/doors are opened or broken, etc. Television receiver 150 may adjust settings of home automation devices based on home security system 207 being armed or disarmed. A virtual control and alarm panel may be presented to a user via a display device 160 and television receiver 150. The functions of a wall mounted panel alarm can be integrated in the graphical user interface of the TV viewing experience such as a menu system with an underlying tree structure. The virtual control and alarm panel can appear in a full screen or Picture-in-Picture (PiP) with TV content. Alarms and event notification can be in the form of scrolling text overlays, popups, flashing icons, etc. Camera video (e.g., from camera 212) can be integrated with the standard DVR content of television receiver 150 with additional search, zoom, time-line capabilities. The camera's video stream can be displayed full screen, PiP with TV content, or as a tiled mosaic to display multiple camera's streams at a same time. In some embodiments, the display can switch between camera streams at fixed intervals. Television receiver 150 may perform video scaling, adjust frame rate and transcoding on video received from camera 212. In addition, television receiver 150 may adaptively transcode the camera content to match an Internet connection.

Irrigation controller 232 of FIG. 2 may allow for a status and control of an irrigation system (e.g., sprinkler system) to be controlled by a user via television receiver 150 and/or overlay device 251. Irrigation controller 232 may be used in conjunction with weather sensor 206 to determine whether and/or for how long irrigation controller 232 should be activated for watering. Further, a user, via television receiver 150 and/or overlay device, may turn on, turn off, or adjust settings of irrigation controller 232.

One or more motion sensors can be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat 222, shutting off lights via light controller 220, and determining if one or more doors are closed by door sensor 208. In some embodiments, a user-defined script may be run when it is determined that no users or other persons are present within the structure.

Additional forms of sensors not illustrated in FIG. 2 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless device 216 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 when within range. For instance, when a vehicle has been parked within range of a local wireless network with which television receiver 150 is connected, video and/or audio may be transmitted from the dashcam to the television receiver for storage and/or uploading to a remote server.

The home automation functions detailed herein that are attributed to television receiver 150 may alternatively or additionally be incorporated into overlay device 251. As such, a separate overlay device 251 may be connected with display device 160 to provide home automation functionality.

Figure 3:
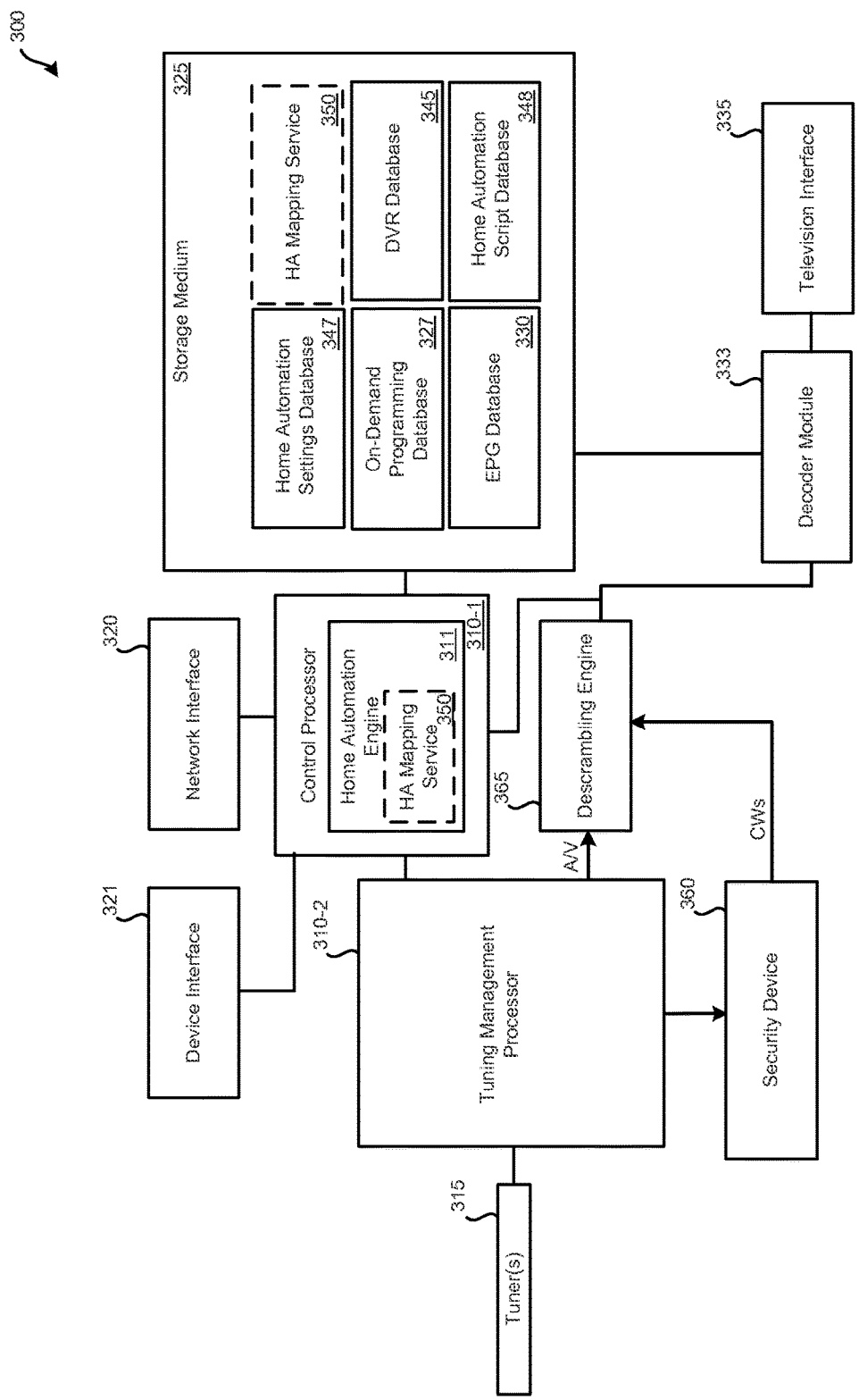
FIG. 3 illustrates an embodiment of a television receiver configured to host a home automation system, according to one or more embodiments of the disclosure.

Referring now to FIG. 3, an embodiment of a television receiver 300, which may represent television receiver 150 of FIG. 1 and/or FIG. 2, is illustrated. Television receiver 300 may be configured to function as a host for a home automation system either alone or in conjunction with a communication device, such as communication device 252 of FIG. 2. Television receiver 300 may be in the form of a separate device configured to be connected with a display device, such as a television. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

As shown in FIG. 3, television receiver 300 may be incorporated as part of a television, such as display device 160 of FIG. 1. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, digital video recorder (DVR) database 345 (which may include provider-managed television programming storage and/or user-defined television programming), on-demand programming database 327, home automation settings database 347, home automation script database 348, security device 360, and/or descrambling engine 365. In another aspect, the television receiver 300 may include a home automation mapping service 350, which may be provided for in the storage medium 325 and/or the control processor 310-1, such as the home automation mapping service 350 within the home automation engine 311 executed by the control processor 310-1.

In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components. For instance, the home automation settings database 347, home automation script database 348, and/or volume controls engine 350 may be provided for, wholly or partly, in the overlay device 241.

In FIG. 3, processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 of FIG. 3 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320, device interface 321, and/or a remote control interface. Control processor 310-1 may handle incoming data from network interface 320 and device interface 321, which may receive input from a remote control. Additionally, control processor 310-1 may be configured to output data via network interface 320.

Control processor 310-1 of FIG. 3 may include the home automation engine 311. Home automation engine 311 may permit television receiver 300 and control processor 310-1 to provide home automation functionality. Home automation engine 311 may have a JSON (JavaScript Object Notation) command interpreter or some other form of command interpreter that is configured to communicate with wireless devices via network interface 320 and a message server (possibly via a message server client). Such a command interpreter of home automation engine 311 may also communicate via a local area network with devices (without using the Internet). Home automation engine 311 may contain multiple controllers specific to different protocols; for instance, a ZigBee® controller, a Z-Wave® controller, and/or an IP camera controller (wireless LAN, 802.11) may be present. Home automation engine 311 may contain a media server configured to serve streaming audio and/or video to a remote devices (on a local area network or the Internet). Television receiver may be able to serve such devices with recorded content, live content, and/or content recorded using one or more home automation devices, such as camera 212.

Tuners 315 of FIG. 3 may include one or more tuners used to tune to transponders that include broadcasts of one or more television channels. Such tuners may be used also to receive for storage on-demand content and/or credit-earning television commercials and/or home automation functions. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to which frequencies are to be tuned.

Network interface 320 of FIG. 3 may be used to communicate via an alternate communication channel with a television service provider, if such communication channel is available. A communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Besides the primary communication channel being satellite, cable network, an IP-based network, or broadcast network may be used. Network interface 320 may permit wireless communication with one or more types of networks, including using home automation network protocols and wireless network protocols. Also, wired networks may be connected to and communicated with via network interface 320. Device interface 321 may represent a USB port or some other form of communication port that permits communication with a communication device.

Storage medium 325 of FIG. 3 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to on-demand programming database 327, EPG database 330, DVR database 345, home automation settings database 347, and/or home automation script database 348. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

Home automation settings database 347 of FIG. 3 may allow configuration settings of home automation devices and user preferences to be stored. Home automation settings database 347 may store data related to various devices that have been set up to communicate with television receiver 300. For instance, home automation settings database 347 may be configured to store information on which types of events should be indicated to users, to which users, in what order, and what communication methods should be used. For instance, an event such as an open garage may only be notified to certain wireless devices (e.g., a cellular phone associated with a parent, not a child), notification may be by a third-party notification server, email, text message, and/or phone call. In some embodiments, a second notification method may only be used if a first fails. For instance, if a notification cannot be sent to the user via a third-party notification server, an email may be sent.

Home automation settings database 347 of FIG. 3 may store information that allows for the configuration and control of individual home automation devices which may operate using Z-wave and Zigbee—specific protocols. To do so, home automation engine 311 may create a proxy for each device that allows for settings for the device to be passed through a UI (e.g., presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device.

Home automation script database 348 of FIG. 3 may store scripts that detail how home automation devices are to function based on various events occurring. For instance, if stored content starts being played back by television receiver 300, lights in the vicinity of display device 160 may be dimmed and shades may be lowered by shade controller 204. As another example, when a user shuts programming off late in the evening, there may be an assumption the user is going to bed. Therefore, the user may configure television receiver 300 to lock all doors via lock controller 230, shut the garage door via garage controller 228, lower a heat setting of thermostat 222, shut off all lights via light controller 220, and determine if any windows or doors are open via window sensor 210 and door sensor 208 (and, if so, alert the user). Such scripts or programs may be predefined by the home automation/television service provider and/or may be defined by a user.

In some embodiments, home automation script database 248 of FIG. 3 may allow for various music profiles to be implemented. For instance, based on home automation settings within a structure, appropriate music may be played. For instance, if the lights are dimmed, romantic music may be played. Conversely, based on the music being played, settings of home automation devices may be determined. If television programming, such as a movie, is output for playback by television receiver 150, a particular home automation script may be used to adjust home automation settings (e.g., lower lights, raise temperature, and lock doors).

EPG database 330 of FIG. 3 may store information related to television channels and the timing of programs appearing on such television channels. EPG database 330 may be stored using storage medium 325, which may be a hard drive or solid-state drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320, via satellite, or some other communication link with a television service provider (e.g., a cable network). Updates to EPG database 330 may be received periodically. EPG database 330 may serve as an interface for a user to control DVR functions of television receiver 300, and/or to enable viewing and/or recording of multiple television channels simultaneously. EPG database 340 may also contain information about on-demand content or any other form of accessible content.

Decoder module 333 of FIG. 3 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously-recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365, simultaneously. For instance, decoders within decoder module 333 may be able to only decode a single television channel at a time. Decoder module 333 may have various numbers of decoders.

Television interface 335 of FIG. 3 may serve to output a signal to a television (or another form of display device) in a proper format for display of video and playback of audio. As such, television interface 335 may output one or more television channels and/or stored television programming from storage medium 325 (e.g., television programs from DVR database 345, television programs from on-demand programming 330 and/or information from EPG database 330) to a television for presentation. Television interface 335 may also serve to output a CVM.

Still referring to FIG. 3, digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 of FIG. 3 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, in a satellite-based television service provider system, data necessary to create the provider-defined timers at television receiver 150 may be received via satellite.

Still referring to FIG. 3, as an example of DVR functionality of television receiver 300 being used to record based on provider-defined timers, a television service provider may configure television receiver 300 to record television programming on multiple, predefined television channels for a predefined period of time, on predefined dates. For instance, a television service provider may configure television receiver 300 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 325 for provider-managed television programming storage.

On-demand programming database 327 of FIG. 3 may store additional television programming. On-demand programming database 327 may include television programming that was not recorded to storage medium 325 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 327 may be the same for each television receiver of a television service provider. On-demand programming database 327 may include pay-per-view (PPV) programming that a user must pay and/or use an amount of credits to view. For instance, on-demand programming database 327 may include movies that are not available for purchase or rental yet. Typically, on-demand programming is presented commercial-free.

Referring back to tuners 315 of FIG. 3, television channels received via satellite (or cable) may contain at least some scrambled data. Packets of audio and video may be scrambled to prevent unauthorized users (e.g., nonsubscribers) from receiving television programming without paying the television service provider. When a tuner of tuners 315 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 300 may use decryption engine 361 of security device 360 to decrypt ECMs. Decryption of an ECM may only be possible if the user has authorization to access the particular television channel associated with the ECM. When an ECM is determined to correspond to a television channel being stored and/or displayed, the ECM may be provided to security device 360 for decryption.

Tuning management processor 310-2 of FIG. 3 may be in communication with tuners 315 and control processor 310-1. Tuning management processor 310-2 may be configured to receive commands from control processor 310-1. Such commands may indicate when to start/stop receiving and/or recording of a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data.

Descrambling engine 365 of FIG. 3 may use the control words output by security device 360 in order to descramble video and/or audio corresponding to television channels and/or home automation functions for storage and/or presentation. Video and/or audio data contained in the transponder data stream received by tuners 315 may be scrambled. Video and/or audio data may be descrambled by descrambling engine 365 using a particular control word. Which control word output by security device 360 to be used for successful descrambling may be indicated by a scramble control identifier present within the data packet containing the scrambled video or audio. Descrambled video and/or audio may be output by descrambling engine 365 to storage medium 325 for storage (in DVR database 345) and/or to decoder module 333 for output to a television or other presentation equipment via television interface 335.

In some embodiments, the television receiver 300 of FIG. 3 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 300 may be configured to reboot at random times during the night in order to allow for installation of updates. Thus, an intruder is less likely to guess the time when the system is rebooting. In some embodiments, the television receiver 300 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system described further below.

While the television receiver 300 has been illustrated as a satellite-based television receiver, it is to be appreciated that techniques below may be implemented in other types of television receiving devices, such a cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 300 may be performed by an overlay device. If such an overlay device, television programming functions may still be provided by a television receiver that is not used to provide home automation functions.

Figure 4:
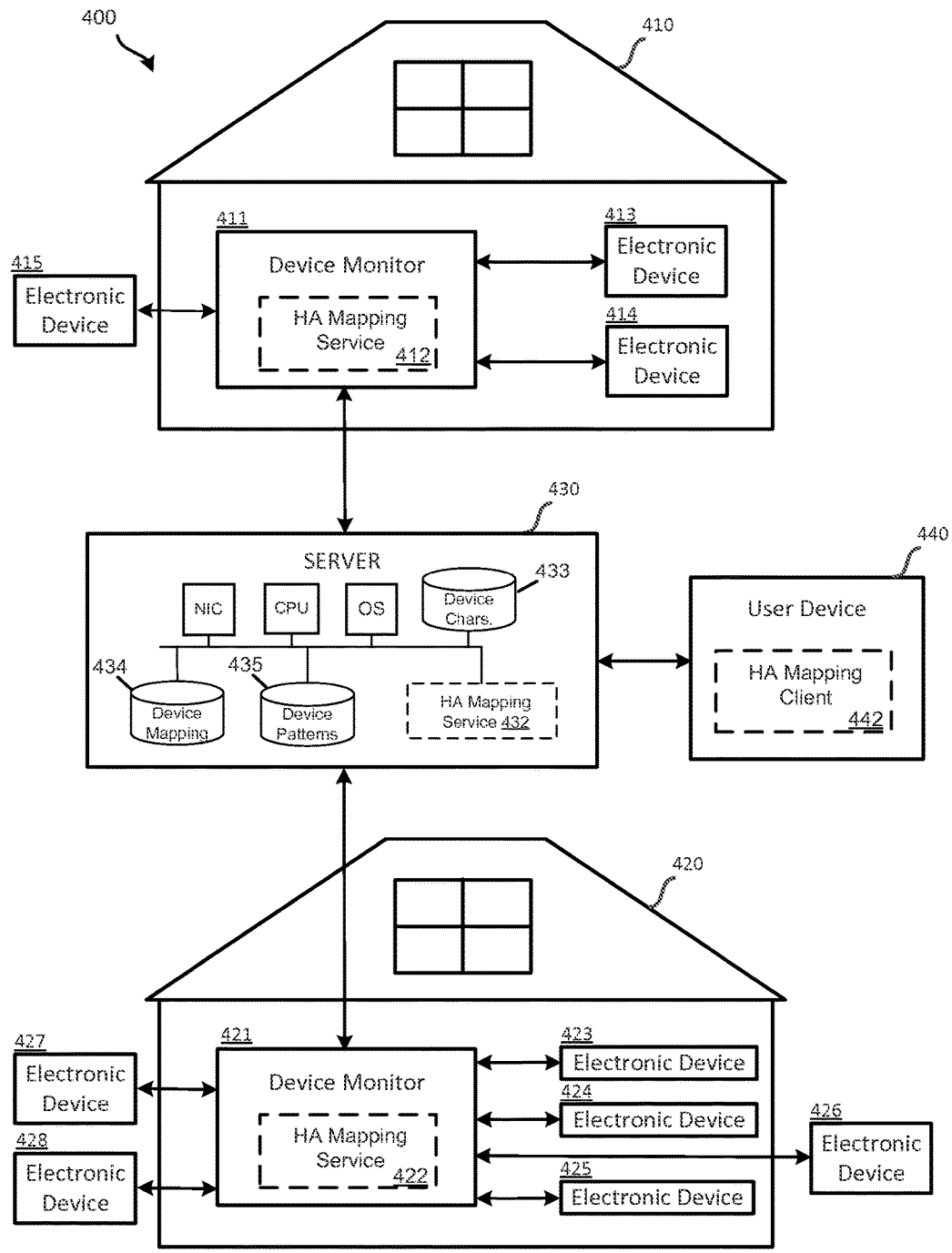
FIG. 4 illustrates an embodiment of a computing environment of a device monitor and control system configured to clone device behavior across multiple locations, according to one or more embodiments of the disclosure.

Referring now to FIG. 4, a block diagram is shown illustrating an example of a computing environment 400 including various computing systems and electronic devices at multiple physical locations 410 and 420, one or more intermediary servers 430, and one or more user devices 440. As discussed below, devices and components within computing environment 400 may be used to monitor one or more electronic devices 412-415 at a first location 410, and clone the behaviors of the monitored electronic devices via control signals transmitted to corresponding electronic devices 423-428 at a second location 420. Monitoring electronic devices may include analyzing data signals received, directly or indirectly, from such electronic devices, the data signals including operational status data for the electronic devices. As used herein, cloning the behavior of a first electronic device (or simply cloning the first device) may include transmitting a control signal to a second electronic devices in response to an operational status detected at the first electronic device. As described below, cloning a first device need not include replicating the exact same behavior at the second device as the behavior detected at the first device. Certain types of device "cloning" may cause different behaviors at the cloned (or controlled) device than those detected at the original (or controlling) device, for example, based on differences in device types and different options for device operational settings, or based on user preferences. Additionally, the electronic device monitoring and cloning may be performed by device monitors and/or device monitor and control systems which may be implemented at locations 410 and 420, separate locations such as intermediary or central servers 430, and/or within user devices 440.

In order to perform these features and other functionality described herein, each of the components and sub-components shown in example computing environment 400, such as device monitors 411 and 421, server 430, and user device 440, may correspond to a single computing device or server, or to a complex computing system including a combination of computing devices, storage devices, network components, etc. Each of these components and their respective subcomponents may be implemented in hardware, software, or a combination thereof. The components shown in environment 400 may communicate directly with one another, or indirectly via one or more intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the locations 410 and 420, servers 430, and user devices 440 in this computing environment.

Locations 410 and 420 may correspond to physical locations at which one or more electronic devices may operate. Location 410 and 420 may be, for example, primary residences (e.g., houses, apartments, condominiums, etc.), secondary residences, vacation homes, business locations (e.g., stores, office buildings, etc.), or other locations such as schools, churches, community centers, and the like. As shown in this example, locations 410 and 420 may each include a number of separate electronic devices 413-415 and 423-428 operating respectively at the locations. Electronic devices 413-415 and 423-428 may include any device using a power source, and which may be configured for one-way or two-communication with a device monitor 411 or 421. For instance, electronic devices 413-415 and 423-428 may include devices such as interior lights, exterior lights, televisions, radios, audio systems, computers, office equipment, indoor or outdoor speaker systems, cameras, security systems, automated fireplaces, irrigation systems (e.g., outdoor yard sprinkler systems, indoor or outdoor plant/flower watering systems, etc.), garage doors, shade controller devices (e.g., motorized window shades or blinds), water heaters, and thermostats. It should be understood that these examples are illustrative only and non-limiting, and any type of indoor or outdoor electronic device may be used in various embodiments. Moreover, the types of electronic devices operating at a location may depend on the type and function of the location. For instance, electronic devices 413-415 such as lights, televisions, yard sprinkler systems, motorized window shades, and outdoor speaker systems may be found at a first residential location 410, while electronic devices 413-415 such as lights, computers, office equipment, and security cameras may be found at a second business location 410, and so on.

Each electronic device 413-415 and 423-428 may be configured to communicate with one or more associated device monitors 411 or 421. Such communication may be via wired or wireless network interfaces, and may involve any of the communication systems, networks, and networking protocols discussed herein. In some cases, one or more electronic devices 413-415 and 423-428 might only support one-way communication with its respective device monitor 411 or 421. For example, a device 413 may include certain hardware and software components configured to transmit data including the device's operational settings to its device monitor 411, but might not be configured to receive or respond to control signals from the device monitor 411. As discussed below, such a device could have its behavior cloned by another device, but could not be controlled to behave as a clone of another device. Similarly, a device 414 might be configured to respond to control signals from a device monitor 411, but might not transmit any device setting data to the device monitor. Thus, such a device may be set up to behave as a clone of another device, but could not be a controlling device whose behavior was cloned by a different device. Electronic devices 413-415 and 423-428 may include devices having integrated and built-in monitoring, transmission, and/or remote control capabilities, and also legacy devices utilizing separate detachable monitors, transmitters, and controllers where such capabilities were not designed into the original device.

In this example, each location 410 and 420 includes a device monitor 411 and 421. Device monitors 411 and 421 may communicate with the various electronic devices 413-415 and 423-428 operating at locations 410 and 420. As discussed below, device monitors 411 and 421 may receive device setting data (e.g., on/off data, channel data, configuration data) from electronic devices 413-415 and 423-428, and/or may transmit control signals to control the operation of electronic devices. In certain embodiments, device monitors 411 and 421 may be implemented within or integrated into existing network appliances. For example, one or both device monitors 411 and 421 may be television receivers 150, including some or all of the components discussed above in FIGS. 1-3. In other cases, device monitors 411 and 421 may be integrated other network appliances, such as Internet routers, personal computers, home servers, gaming consoles, and the like. In still other cases, device monitors 411 and 421 may be implemented as standalone network appliances. In any of these cases, device monitors 411 and 421 may include various specialized software components (e.g., home automation mapping services 412 and 422) configured to communicate with an associated set of electronic devices 413-415 and 423-428, as well as external computing systems such as servers 430, user devices 440, and/or other device monitors. Additionally, device monitors 411 and 421 may include both general and special-purpose hardware, software, and network components use to communicate with and/or control its associated set of electronic devices 413-415 or 423-428. For example, device monitors 411 may include one or more network interfaces, such as local area networks (LAN) and wide area networks (WAN) interfaces, radio frequency (RF) transceivers for accessing wireless voice and/or data networks, modems (e.g., telephone, satellite, cable, ISDN, etc.), WiFi (IEEE 802.11 family standards or other mobile communication technologies), and/or other network components for communicating with various electronic devices 413-415 and 423-428. Additionally, device monitors 411 and 421 may store device identifiers and authentication data such as passwords and encryption keys. Device monitors 411 and 421 also may include encryption software, support secure network protocols, and include other security features and/or specialized hardware to support secure communication with different types of electronic devices 413-415 and 423-428.

As noted above, device monitors 411 and 421 may correspond to appliances installed at locations 410 and 420, for example, as specialized sets of software and/or hardware components integrated into television receivers 150, routers, gaming consoles, personal computers, and other network appliances operating at locations 410 and 420. However, device monitors 411 and 421 may be optional and need not be used in some embodiments. For example, electronic devices 413-415 or 423-428 may transit via mobile/cellular networks or other long-range transmissions directly to an external server 430. In other examples, one or more mobile devices 440, such as user laptops, smartphones, tablet computers, and the like may be used instead of device monitors 411 and 421. For instance, a user's mobile device 440 may include specialized software (e.g., a mobile application and/or home automation client 442) to receive device setting data from various electronic devices 413-415 or 423-428 and/or to transmit control signals to the devices to implement the device monitoring and cloning techniques described herein.

Server 430 may be implemented as a single computing server, or a computing system including a combination of multiple computing devices, storage devices, network components, etc. In various embodiments, server 430 may be configured to run one or more software applications or services, such as a home automation mapping service 432, to implement and control the device monitoring and device behavior cloning at two or more separate locations 410 and 420. As discussed below, the home automation mapping service 432 may receive device operational settings data from device monitors 411 and 421 at various locations 410 and 420, or directly from electronic devices 413-415 or 423-428, and also may perform device behavior cloning by determining and transmitting control signals to appropriate electronic devices 413-415 or 423-428 based on the device operational settings data received. In various examples, the home automation mapping service 432 may be implemented as a server-side application, web-based service, cloud-based service, or the like. In order to support these services and perform the various features described herein, server 430 may include various hardware, software, and network components, including some or all of the components discussed below in reference to FIG. 10.

Server 430 also may provide one or more client interfaces, including graphical user interfaces and/or application programming interfaces, to support interaction with multiple user devices 440. In some cases, server 430 and device 440 may implement a client-server module, in which the home automation mapping client 442 may correspond to a web browser, mobile application, standalone application, or the like. As discussed below, users may utilize home automation mapping clients 442 to define and confirm device monitoring and device cloning behaviors for multiple electronic devices 413-415 or 423-428 at multiple locations 410 and 420.

In this example, server 430 also includes a device characteristic data store 433, a device mapping data store 434, and a device usage pattern data store 435. As discussed below, data store 433 may store device characteristic data used for identifying and/or mapping devices in different locations having similar device profiles and capabilities. Data store 434 may store a set of user-defined or system-defined device-to-device mappings used to implement device cloning behaviors. Data store 435 may store usage pattern data for various devices 413-415 or 423-428, which may be used in response to power and network outages, for time-shifting the behaviors of a single device at a location, etc. Each data store 433-435 may be implemented as a database, file-based storage system, and/or using other various storage solutions. In some cases, data stores 433-435 may reside on a non-transitory storage medium within the server 430. In other cases, data stores 433-435 may be remote from server 430 and configured to communicate with server 430 via one or more communication networks. In certain embodiments, data stores 433-435 may reside in a back-end server farm, storage cluster, and/or storage-area network (SAN).

Referring to example computing architecture shown in FIG. 4, multiple different system designs may be used for implementing device monitor and control systems which are configured to monitor a set of devices 413-415 or 423-428 and implement device behavior cloning across multiple locations 410 and 420. In some cases, a single computing device, such as a central or intermediary server 430, or a device monitor 411 or 421 at a monitored location 410 or 420, may receive and analyze device data, determine corresponding device cloning behaviors, transmit control signals to various devices, and perform the additional device monitoring and cloning behaviors described herein. However, in other examples the server 430 may be optional, and some or all of the components and features described above in reference to server 430 may be implemented within device monitor 411 and/or device monitor 421. For example, device monitors 411 and 421 at separate locations may communicate directly rather than via a server 430 or central communication hub, and device monitors 411 and 421 may each execute the device monitoring and device behavior cloning functionality within their respective home automation mapping services 412 and 422. In such cases, device monitors 411 and 421 also may store data stores 433-435, provide various client interfaces and other components to perform the device monitoring and cloning functionality at the individual locations 410 and 420, rather than at a central server 430. In still other cases, the device monitoring and cloning functionality may be performed by one or more user devices 440, and thus the server 430 and/or device monitors 411 and 421 may all be optional in certain embodiments. For instance, user device 440 may be configured to receive device operational settings from device monitors 411 and 421 (or directly from devices 413-415 or 423-428), analyze the data, maintain and access data stores 433-435, determine corresponding devices and cloning behaviors, and transmit control signals. In some cases, multiple different user device 440 may be configured to perform such functionality for a set of devices and/or locations associated with a user of the device 440.

Figure 5:
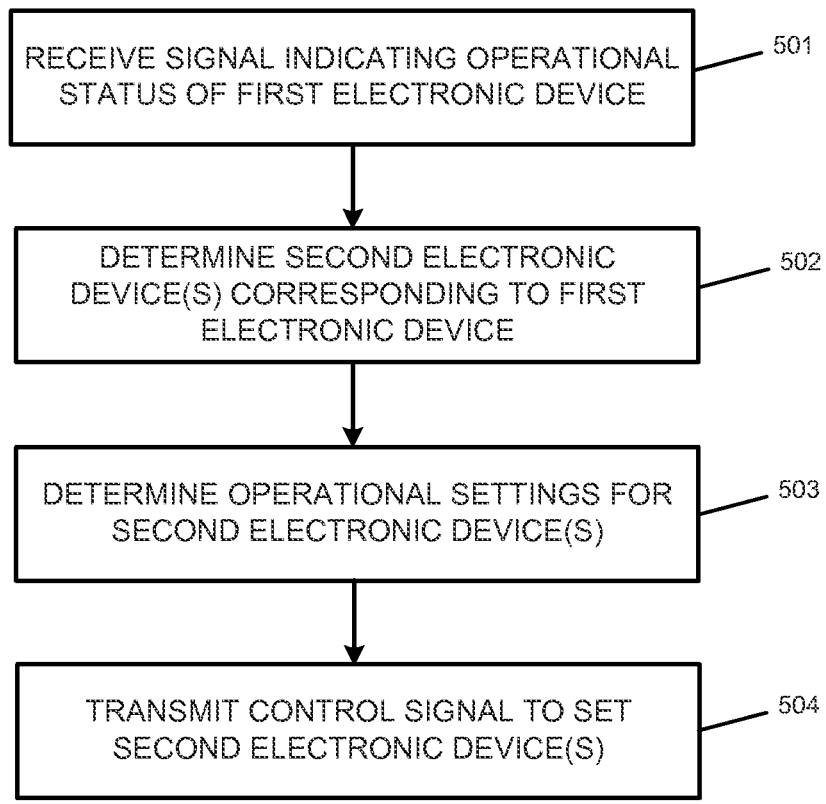
FIG. 5 is a flow diagram illustrating an example process of monitoring and cloning behavior of a first electronic device to a second electronic device at a separate location, according to one or more embodiments of the disclosure.

Referring now to FIG. 5, a flow diagram is shown illustrating a process of monitoring and cloning behavior of a first electronic device at a first location, to a second electronic device at a separate location. As described below, the steps in this process may be performed by one or more components in the device monitor and control system(s) and corresponding computing environment 400 described above, such as server 430, device monitors 411 and 421, and/or user devices 440. However, it should be understood that the processes of monitoring electronic devices, cloning device behaviors across multiple locations, and other features describe herein need not be limited to the specific systems and hardware implementations described above in FIGS. 1-4, but may be performed within other computing environments comprising other combinations of the hardware and software components, such as client-server systems, web-based, cloud-based systems, and the like.

In step 501, data may be received by one or more computing devices, indicating the operational status of an electronic device 413 at a first location 410. For example, in response to a user interaction with an electronic device 413, the device 413 may transmit data including an updated device status to a device monitor 411 at the first location 410, which may then transmit corresponding device setting data to a server 430. As discussed above, in other examples, a device 413 may transmit its updated device status directly to the server 430, to a user device 440, or other device. Thus, the receiving of data in step 501 may be performed by the server 430, a device monitor 411 or 412, and/or a user device 440, etc., and step 501 may correspond to the receiving of data directly from the electronic device 413 itself or indirectly via one or more intermediary devices (e.g., a device monitor 411, user device 440, etc.).

In some embodiments, the electronic device data received in step 501 may uniquely identify the device 413 at which a user interaction was detected, as well as the new and/or updated operational status of the device 413. For example, a device status detection signal received in step 501 may include one or more of a location identifier, a device identifier, and/or a network address of the device 413, as well as one or more data fields indicating the updated operational status of the device 413. Such device status data may include the updated device operational settings, such as the on/off status of the device 413, the updated device configuration data, and/or any other settings on the device 413. As discussed above, device 413 may correspond to various different types of electronic devices, including lights, televisions, computers, various office equipment, irrigation systems, shade controllers, etc. Accordingly, the device operational status received in step 501 may depend on the type of the electronic device 413. For example, simple lights 413 may include only an on/off status as device operational status. More complex lighting systems 413 may include an on/off status along with addition information such as dimmer switch settings, color settings, lighting configurations, etc. The operational status data for other types of devices 413 may include channel data (e.g., for televisions, audio systems), volume data (e.g., for televisions, outdoor speaker systems), angle configuration data (e.g., for security cameras), up-down settings (e.g., for motorized windows shades and blinds), and so on. It should be understood that these examples are illustrative only and non-limiting, and that different types of electronic devices 413-415 or 423-428 may use any number or type of different operational status data.

In addition to the device identification data and the device operational status data discussed above, various other data associated with the setting of an electronic device 413 at a first location 410 may be received and/or determined in step 501. For example, some electronic devices 413 may be configured to detect the time of a user interaction and/or the specific user interacted with the device 413, and such data may be transmitted by the electronic device 413 in step 501. In other cases, time data and/or user data may be determined by devices or systems other than the device 413 itself. For example, a server 430 or device monitor 411 may record the time at which a device status detection signal was received from a device, and data may be retrieved from other electronic devices 413 at the same location 410 (e.g., vehicles-based systems, security systems, set-top boxes, gaming consoles, computers, lighting systems, etc.) to determine which user interacted with the electronic device 413.

In certain embodiments, additional context data that further describes the physical environment of the electronic device 413 and/or location 410, or other conditions under which the user interacted with the electronic device 413, may be received or determined in step 501. Such context data may include, for example, the ambient light conditions at the device 413 or externally at the location 410, the ambient noise conditions at the device 413 or the location 410, the indoor or outdoor temperature, and the like, at the time the user interacted with the device 413. Such context data may be detected by the electronic device 413 itself, or by other electronic devices, user devices 440, and/or device monitors 411 operating at the location 410 (e.g., cameras, thermostats, light sensors, security systems, etc.). Additionally, rather than using sensor-based detection by devices at the location 410, some context data may be determined by external servers 430 by accessing and querying remote computer systems, such as weather data systems, public utilities data systems, and the like.

In step 502, the data received in step 501 may be used to identify one or more electronic devices 423-428 at a different location 420 to be controlled in response to the user interaction with the first device 423 at the first location 410. For example, if indication is received in step 501 that a first interior light 413 has been turned on at location 410, then step 502 may include determining a second interior light 423 at a second location 420 to be turned on in order to clone the first interior light 413. Similarly, if the data received in step 501 indicates that a first television 413, first window shade controller 414, or first sprinkler system 415 at location 410 has been activated, then step 502 may include determining a corresponding second television 423, second window shade controller 424, or second sprinkler system 425 to activate at the second location 420.

Although the above examples illustrate device monitoring and cloning between devices of the same type (e.g., a first light 413 to a second light 423, a first security system 414 to a second security system 424, etc.), in other examples devices may mapped to different types of devices (e.g., a first light 413 to a second television 423, an interior light 413 to an exterior light 426, etc.). Additionally, the device monitoring and device behavior cloning techniques described herein need not be performed using a one-to-one device mapping as in the above examples. For instance, a one-to-many device mapping may be used, such that a change in the operational status of a single device 413 at a first location 410 may cause updates to the operational statuses of multiple devices 423-428 at a second location 420. In other cases, a many-to-one device mapping may be used, such that a change in the operational statuses of any one of multiple devices 413-415 at a first location 410 may cause an update to the operational status of a single devices 423 at a second location 420. In still other cases, various types of many-to-many device mappings may be supported, such that a change in the operational statuses of any one of multiple devices 413-415 (or changes to a specific predetermined combination of devices 413-415) at a first location 410, may cause an update to the operational statuses of multiple devices 423-428 (or changes to a specific predetermined subset of devices 423-428) at a second location 420.

Referring briefly to FIG. 6A, an illustrative example of a device-to-device mapping table 600a is shown containing sample data. In this example, each row in mapping table 600a may correspond to a device mapping used to clone the device behaviors of a first controlling device with a second controlled device. Each electronic device listed table 600a is identified by a network (e.g., MAC) address of a device monitor 411 or 421, along with a device identifier uniquely identifying the specific electronic device at that location. Specifically, device mapping table 600a shows four separate mappings of controlling devices to controlled devices, including a mapping of a first controlling device at a first location (MAC Address NN-NN-NN-NN-NN-NN; ID=00001) to a single controlled device at a second location (MAC Address MM-MM-MM-MM-MM-MM; ID=00016), and mappings of a second controlling device at the first location (MAC Address NN-NN-NN-NN-NN-NN; ID=00003) to three separate controlled device at two different locations. Although device monitor MAC addresses and device identification numbers are used in this example, in other examples device mapping tables may use IP addresses, physical location addresses, user names, device names, model numbers, and/or serial numbers, or any other combination of location and device data that uniquely identifies controlling and controlled electronic devices.

Device mappings, like those described above, used to perform the device behavior cloning techniques described herein, may be expressly defined by users, automatically determined based on the characteristics and capabilities of the different electronic devices 413-415 and 423-428, or may be determined using a combination of user selections and device characteristics and capabilities. For instance, a user may interact with a client interface 442 provided on a user device 440 to select a first device 413 at a first location 410, then a second device 423 at a second location 420, and then initiate the cloning behavior between the two devices. In other cases, a user may select various sets of device characteristics and/or capabilities rather than identifying devices specifically, to initiate device cloning between one or more controlling devices and one controlled devices at the selected locations that satisfy the characteristics and/or capabilities input by the user.

Referring briefly to FIG. 6B, an illustrative example of a device characteristic mapping table 600b is shown containing sample data. In this example, each row in mapping table 600b may correspond to a single device, including location and device identifying data, as well as a device type (e.g., light, television, shade controller, irrigation system, etc.), device location (e.g., interior or exterior, floor, room, etc.), and the list of possible operational statuses/settings for the device (e.g., on/off, dimmer switch settings, lighting configurations, etc.). Using device characteristic data such as the data shown in FIG. 6B, partially-automated or fully-automated device mappings may be determined in step 502 for performing device behavior cloning. For example, a user may select a device type (e.g., interior light) and device location (e.g., office) via a user interface, rather than selecting specific electronic devices, after which the server 430 may use these user-selected device characteristics to automatically determine one or more controlling devices 413-415 and one or more controlled devices 423-428 to create the device mapping. In other examples, a user may define a device mapping based on device type only, device location only, device operational settings options only, or any combination of these characteristics and/or other device characteristics described herein. Additionally, a server 430 may support fully-automated device mappings in some embodiments, in which a user need not select any specific devices or any device criteria, but instead the server 430 may automatically create one or more device-to-device mappings based on the characteristics and capabilities of the different devices 413-415 and 423-428 at locations 410 and 420.

In step 503, the data received in step 501 may be used to determine the device settings to be applied to the controlled electronic device(s) determined in step 502. Specifically, the device setting data received in step 501 for the first (controlling) device 413 at the first location 410 may be mapped to corresponding device settings for the second (controlled) device(s) at the second location 420. In some cases, the new/updated device settings of the first device 413 may be mapped directly to a second device 423. For example, when a first light 413 (or television, audio system, irrigation system, etc.) at the first location 410 is detected as having been turned-on, a corresponding light 423 (or television, audio system, irrigation system, etc.) at the second location 420 may be turned-on. In other cases, such direct mappings between device settings might not be possible, and a combination of user selections and/or automated mapping determinations may be used to determine the device settings to be applied to controlled electronic devices in step 503. For example, when mapping a light 413 having a dimmer switch to a simple on/off light 423 without a dimmer switch, a first range of dimmer switch settings (e.g., 0-5) for the controlling light 413 may be mapped to an off state for the controlled light 423, and a second range of dimmer switch settings (e.g., 6-10) for the controlling light 413 may be mapped to an on state for the controlled light 423. As another example, when mapping a shade controller device 413 at a first location 410 to a light 423 at a second location, a "shade down" state for the shade controller 413 may be mapped to an on state for the light 423, or vice versa. Such determinations may be performed in step 503, based on previous received user mappings between device settings, or may be performed automatically by the system based on predetermined mappings of device settings between devices of different types, different locations, different operational status/settings options, etc.

In step 504, one or more control signals may be transmitted to the device(s) determined in step 502, in order to activate and/or configure the devices in accordance with the operational settings determined for the device in step 503. For example, a control signal to a controlled (or target) device 423 may include location data and/or device identifier data that uniquely identifies the controlled device 423, along with the device operational settings data that instructs the controlled device 423 to update its operational state (e.g., on/off, channel, volume, and/or other configuration states) to the desired device settings. As discussed above in reference to step 501, the transmission of control signals in step 504 may be performed by one or multiple computing devices within a device monitor and control system and/or computing environment 400. For example, if the controlled electronic devices 423-428 and the corresponding device operational settings are determined by a central server 430, then the server 430 may transmit a control signal to the appropriate device monitor 421, which may receive and process the data from the server 430 and then transmit one or more additional control signals to the individual devices 423-428. As discussed above in step 501, in various different implements, control signals may be transmitted directly or indirectly to the target electronic devices 423-428 by one or more servers 430, remote device monitors 411, local device monitors 421, and/or user devices 440.

Figure 7:
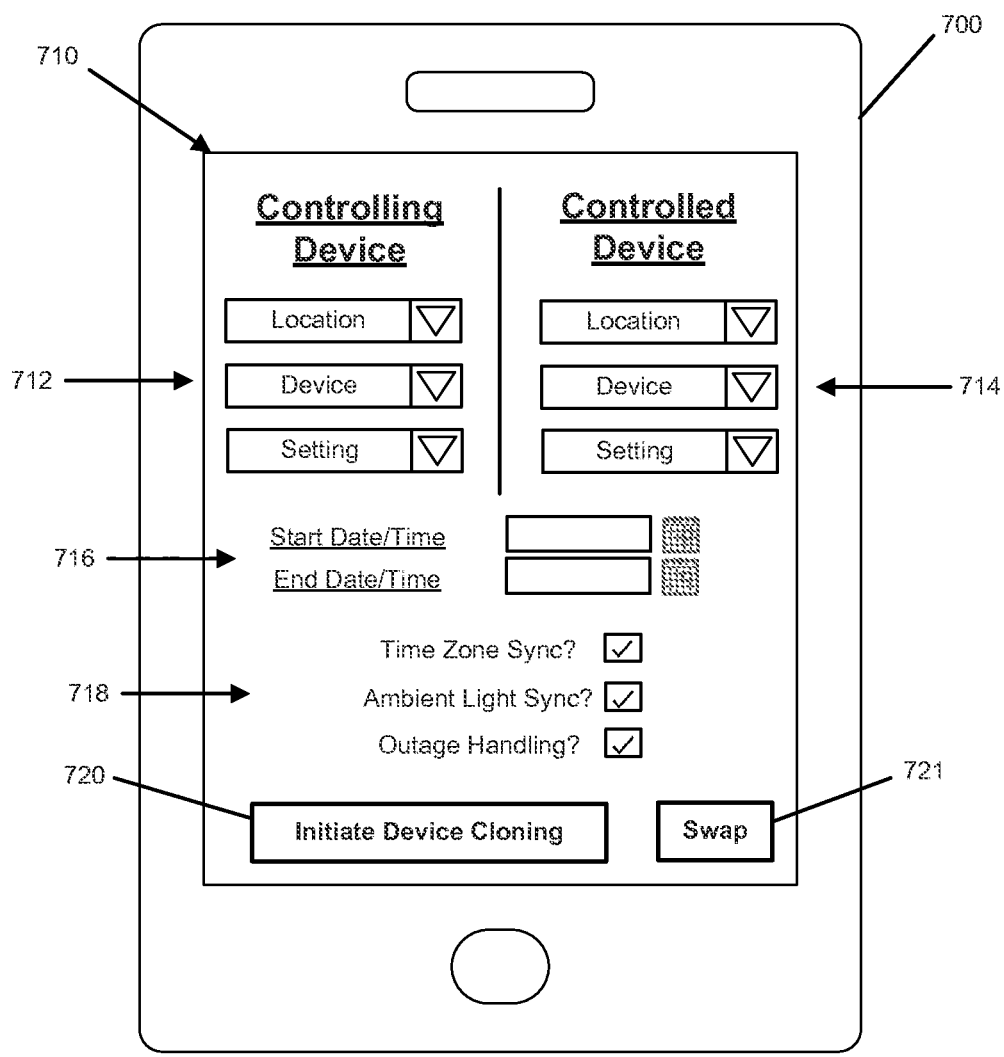
FIG. 7 is an illustrative user interface used to define cloning behavior of electronic devices across locations, according to one or more embodiments of the disclosure.

Referring briefly to FIG. 7, an example user interface is shown allowing a user to initiate device behavior cloning between two electronic devices: a controlling device and a controlled device. In this example, user interface 710 may be displayed on a mobile device 700 via a mobile client application, web-browser, standalone application, etc. After the user authenticates and accesses the client application, the client application may retrieve (e.g., from server 430) lists of the user's associated locations, devices, and device characteristics in order to populate the user interface 710. In this example, the user interface 710 includes a first region 712 to allow the user to define a first controlling device by location (e.g., location 410), device name/description (e.g., interior light 413), and device operational settings (e.g., setting=on or dim), and a second region 714 to allow the user to define a second device to be controlled based on the first controlling device by location (e.g., location 420), device name/description (e.g., exterior light 426), and device operational settings (e.g., setting=on). As discussed above, in some cases the operational settings for the controlling device 712 and controlled device 714 may be determined automatically, and thus might not be presented as configurable options within the user interface 710. Additionally, although in this example the user selects devices by name and/or description, in other examples the user might select device characteristics and capabilities (e.g., device type, relative device location within the physical location 410 or 420, device operational settings options, etc.) and the client application and/or server 430 may automatically determine specific device-to-device mappings based on the user-selected device characteristics and capabilities.

The user interface 710 in this example includes a third region 716 allowing the user to configure the start time and end time for device behavior cloning from the controlling device to the controlled device. In some cases, a user may initiate an ongoing cloning process between electronic devices for an indefinite period of time, while in other cases a user interface 710 may allow the user to configure the specific days/times that the device cloning will be performed by the system (e.g., weekends only, all nights only between 6:00 pm and 6:00 am, weekday afternoons between 12:00 pm and 5:00 pm, etc.). During time periods not specified by the user for cloning device behaviors, the controlling electronic device (e.g., 413) and/or device monitor (e.g., 411) may be configured not to transmit signals for setting the device, and/or the server 430 may be configured not to transmit control signals to the controlled device (e.g., 423) during those times.

A fourth region 718 in example user interface 710 includes a number of additional options that may be specified by the user when initiating a cloning process between devices at different locations 410 and 420. For example, a "Time Zone Sync" option allows users to time-delay the device behavior cloning between electronic devices at locations 410 and 420 in different time zones, so that a device behavior detected at a controlling device (e.g., 413) will cause a corresponding device behavior to occur at the controlled device (e.g., 423) at the same local time, rather than in real-time or near real-time. For example, if an electronic device 413 at a first location 410 on the east coast is activated at 8:00 pm local time, then a corresponding control signal may be sent to a second electronic device 423 at a second location 420 on the west coast after a three-hour time delay, so that the second electronic device 423 is also activated at 8:00 pm local time. This feature may provide advantages in certain embodiments, such as providing a more realistic appearance that the second location is occupied, or performing maintenance tasks at the second location at more preferred times, etc. If the time zone of the first controlling device 413 is behind the time zone of the second controlled device 423, then the system may disable the time zone sync option in some embodiments, because the corresponding local time at the second controlled device 423 has already passed. Alternatively, the system may provide an option to time-delay the device cloning behavior for the controlled device 423 until the same corresponding local time the next day, when the controlled device 423 is in a time zone ahead of the controlling device 413.

Another option shown in the fourth region 718 of the example user interface 710 is an "Ambient Light Sync" option, which allows users to time-delay the device behavior cloning between electronic devices at different locations 410 and 420 having different external ambient light conditions, so that a device behavior detected at a controlling device (e.g., 413) will cause a corresponding device behavior to occur at the controlled device (e.g., 423) when the external ambient light conditions are the same, rather than in real-time or near real-time. As with the time zone sync feature, this feature may provide advantages such as providing a more realistic appearance that the second location is occupied (e.g., turning on exterior lights at sunset), or performing maintenance tasks at the second location at more preferred times (e.g., turning on a sprinkler system at dawn), etc.

The fourth region 718 of the example user interface 710 also includes an "Outage Handling" option. As discussed below in reference to FIGS. 8-9, various embodiments may support one or more options to configure device behavior cloning in the event of power outages and/or network outages at the first location 410 and the second location 420. For example, if a device behavior cloning has been initiated between electronic devices 413-415 at a first controlling location 410 and electronic devices 423-428 at a second controlled location 420, then a power outage or network outage the at the first controlling location 410 may cause the controlled electronic devices 423-428 to turn off or to remain in their current operational state indefinitely, which may be undesirable. Accordingly, as discussed below, device usage patterns may be detected and used in some embodiments to control a set of controlled electronic devices 423-428 in the event of power or network outages.

After selecting the controlling and controlled devices, the device cloning start and end times, and/or various options, the user may initiate a device cloning relationship between the devices by selecting button 720. In some cases, a swap button 721 (or other corresponding user interface components) may be provided to allow the user to quickly sway one or more controlling devices with one or more controlled devices. In some cases, a swap button 721 may become visible and/or active only after device cloning relationships have been initiated. In such cases, a user interface such as the one shown in FIG. 7 may be used to retrieve and display the device cloning behaviors that have been initiated and are currently active, and the swap button 721 may be used to change the controlled device to the controlling device, and vice versa. In some embodiments, a swap button 721 may be used to swap multiple controlled devices and controlling devices, for example, all of the controlling devices at a first location 410 may be swapped to become controlled devices, and all of the previously controlled devices at a second location 420 may become the controlling devices. A swap button 721 controlling multiple devices may be used in certain scenarios, such as when a user leaves a primary residence and arrives at a secondary residence. In this case, a swap button 721 may be used to easily swap some or all of the controlling device-controlled device relationships between the various devices at the primary and secondary residences.

Figure 8:
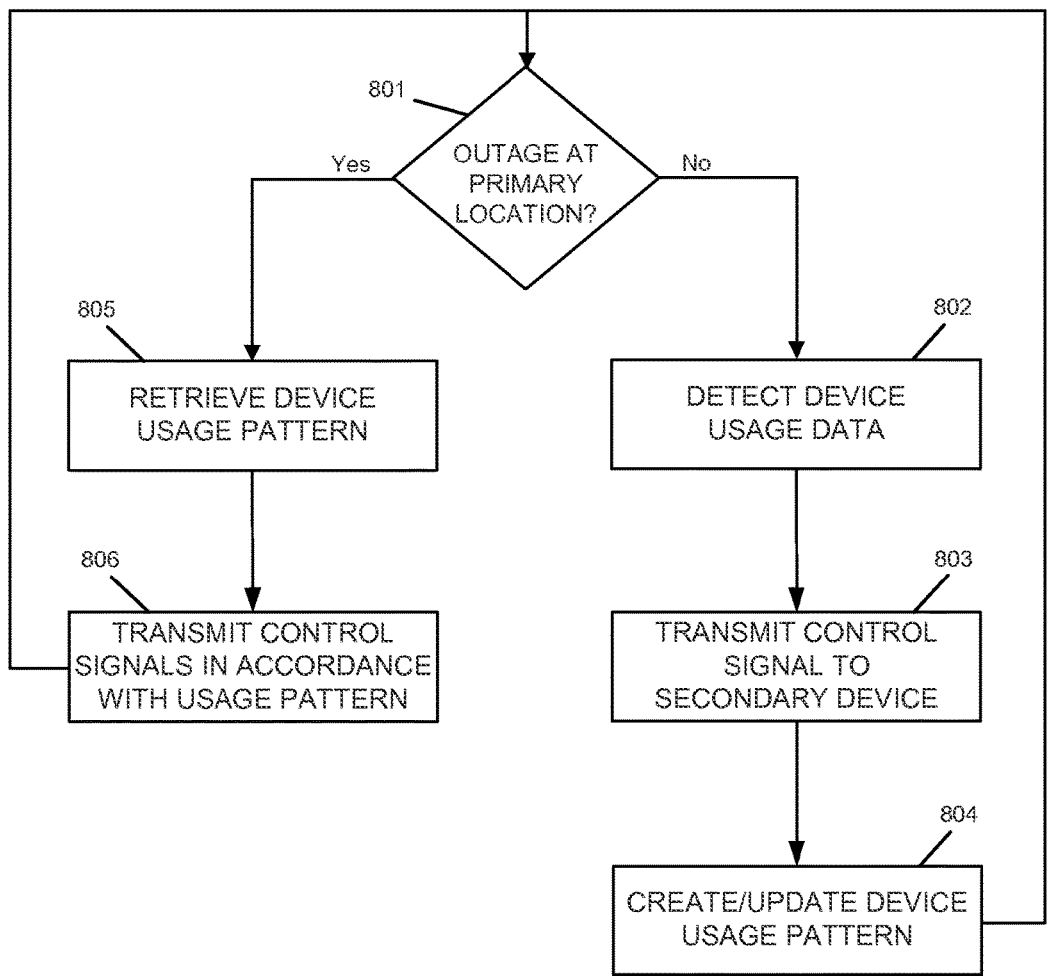
FIG. 8 is a flow diagram illustrating another example process of monitoring and cloning behavior of a first electronic device to a second electronic device at a separate location, according to one or more embodiments of the disclosure.

Referring now to FIG. 8, a flow diagram is shown illustrating another process of monitoring and cloning behavior of a first electronic device at a first location, to a second electronic device at a separate location. Similar to FIG. 5 described above, the steps in this process may be performed by one or more components in the device monitor and control systems and corresponding computing environment 400, such as servers 430, device monitors 411 and 421, and/or user devices 440. However, the processes of monitoring electronic devices, creating and using device usage patterns, and cloning device behaviors across multiple locations need not be limited to the specific systems and hardware implementations described above in FIGS. 1-4, but may be performed within other computing environments comprising other combinations of the hardware and software components, such as client-server systems, web-based, cloud-based systems, and the like.

In step 801, after the initiation of a device behavior cloning process between one or more electronic devices 413-415 at a primary (or controlling) location 410 and one or more electronic devices 423-438 at a secondary (or controlled) location 420, the primary location 410 may be monitored to detect a power outage, network outage, or outage among one or other utilities or services (e.g., a cable outage, satellite outage, water outage, etc.). In some embodiments, a server 430 may monitor the primary location 410 and/or second location 420 using periodic simple network requests, electronic device status requests, and the like. Additionally or alternatively, locations 410 and 420 may be monitored by device monitors 421 and 422 (which may or may not be affected by an outages at the locations, depending on the type and severity of the outages), and/or user devices 440 such as smartphones and other mobile devices (e.g., devices having independent power and network sources which would not be affected by outages at the locations).

During normal conditions in which no power outages or network outages are detected at the primary location 410 (801:No), the device behavior cloning processes initiated between primary location 410 and any secondary locations 420 may continue normally as described above. For example, in step 802 a device usage data may be received indicating that the operational status has been changed of a controlling electronic device 413 at the primary location 410 (e.g., via a user interaction with the controlling device 413).

In step 803, a corresponding control signal may be sent to one or more controlled devices 423 at the secondary location 420 in response to the device usage data received in step 802. Accordingly, steps 802 and 803 may use similar or identical techniques to those discussed above in reference to steps 501-504.

In step 804, device usage patterns may be established based on the device usage data received in step 802 for any electronic devices at the primary location 410. In some examples, device usage patterns may be created after a minimum threshold of device usage instances have been detected for an electronic device 413 at the primary location 410. In some embodiments, the operational status data for an electronic device 413 may be monitored over a number of days, weeks, or months to establish and then continuously update device usage patterns for the device 413. The server 430 and/or other components within the device monitor and control systems described herein may calculate device usage patterns using various different analysis techniques, such as averaging device usage data (e.g., activation and deactivation times, light dimmer settings, speaker volumes, etc.), analytics or predictive analysis techniques, etc.

Referring briefly to FIG. 9, an example device usage pattern table 900 is shown containing sample pattern data for a controlling electronic device 413 at a primary location (MAC Address NN-NN-NN-NN-NN-NN; ID=00013). As shown in this example, device usage patterns may include days, times, and corresponding device operational statuses/settings. Although the device pattern data in this example refers only to days of the week and specific times, more complex usage patterns may be established in other examples, such as patterns corresponding to specific dates, monthly, yearly, or seasonal patterns, and the like. Moreover, although the device operational settings in this example shows only "On" or "Off", additional types of device settings may be shown for electronic devices 413 having additional potential settings and configurations, such as dimmer switch settings, television/radio tuner channels, audio device volumes, camera configuration angles, shade controller up-down settings, etc.

After device usage patterns have been established for one or more electronic devices 413-415 at a primary location 410, an outage occurring at the primary location 410 may be detected in step 801 (801:Yes). As discussed above, a server 430 and/or other system components may detect a power outage, network outage, or various other types of outages affecting the devices 413-415 at the primary location 410. Thus, the outages detected in step 801 may be outages that affect the operation of the electronic devices 413-415 (e.g., power outages), or outages that affect the ability of the server 430 and/or other system components to receive updated device statuses (e.g., network outages). Additionally, device-specific outages (e.g., hardware failures) also may be detected in step 801 for one or more specific controlling devices 413, even though such failures might not affect other electronic devices at the first location 410.

In step 805, after detecting an outage at the primary location 410 (801:Yes), the server 430 (and/or other system components) may retrieve device usage pattern data from any electronic devices 413-415 affected by the outage. In step 806, the device usage pattern data retrieved in step 805 may be used to transmit control signals to any electronic devices 423-428 at the secondary location 420 which correspond to (e.g., for which device behavior cloning has been initiated) the devices 413-415 at the primary location 410 that have been affected by the outage. For example, referring again to FIG. 9, after detecting an outage affecting the electronic device (MAC Address NN-NN-NN-NN-NN-NN; ID=00013), a server 430, a device monitor 421 at the secondary location 420, and/or a user device 440 may retrieve the device usage pattern data from table 900, and use the data to determine and transmit control signals to corresponding mapped devices at one or more secondary locations 420.

Techniques which involve creating and using device usage patterns for a set of electronic devices 413-415 at a first location 410, such as those techniques described above in reference to FIGS. 8 and 9, also may be used to initiate time-shifted device behavior cloning, rather than device- and location-shifting device behavior cloning. For example, after establishing a set of device usage patterns for devices 413-415 at a first location 410, these device usage patterns may be used not only to control devices 423-428 at a second location 420, but also to control the same devices 413-415 at the first location 410 during a different time period. For example, if the first location 410 will be unoccupied and unused during an upcoming period of time (e.g., a family vacation at a primary residence, an unoccupied period of a rental house/apartment, a store or office closure, etc.), then the device usage patterns previous determined for the first location 410 may be re-applied to first location during the unoccupied and unused time period.

Figure 10:
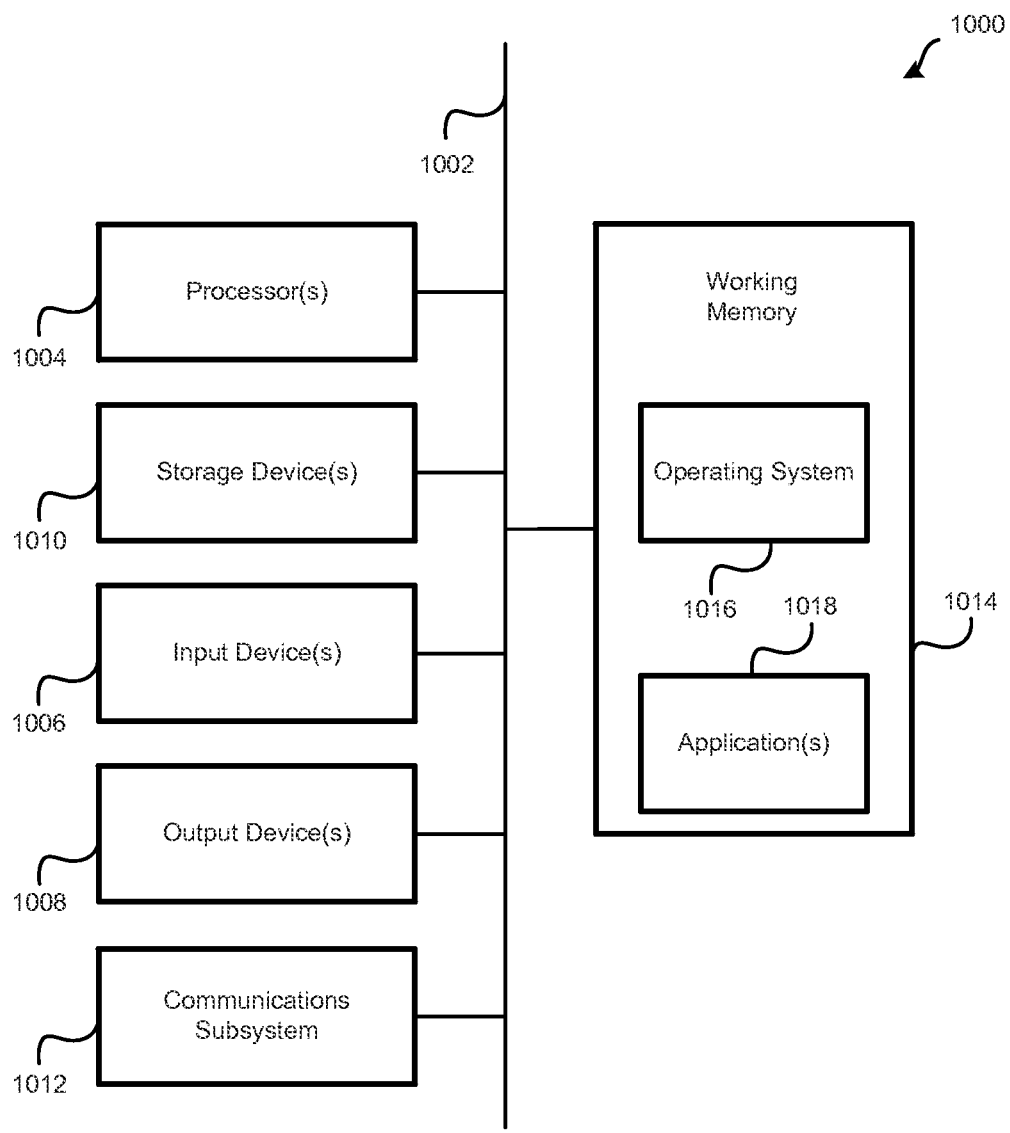
FIG. 10 is a block diagram illustrating an example computing system upon which various features of the present disclosure may be implemented.

Referring now to FIG. 10, an example block diagram for a computer system or device 1000 upon which various features of the present disclosure may be implemented is shown. Examples of computer system or device 1000 include an enterprise server, blade server, desktop computer, laptop computer, tablet computer, personal data assistant, smartphone, gaming console, set-top box, router, television receiver, and/or any other type of machine configured for performing calculations. Any particular one of the previously-described computing devices may be wholly or at least partially configured to exhibit features similar to the computer system 1000, such as any of the respective elements of at least FIG. 1, FIG. 2, and FIG. 3. In this manner, any of one or more of the respective elements of at least FIG. 1, FIG. 2, and FIG. 3 may be configured to perform and/or include instructions that, when executed, perform the methods, features, and other techniques of FIGS. 4-9.

The computer device 1000 is shown comprising hardware elements that may be electrically coupled via a bus 1002 (or may otherwise be in communication, as appropriate). The hardware elements may include a processing unit with one or more processors 1004, including without limitation one or more general-purpose processors and/or one or more special-purpose processors (such as digital signal processing chips, graphics acceleration processors, and/or the like); one or more input devices 1006, which may include without limitation a remote control, a mouse, a keyboard, and/or the like; and one or more output devices 1008, which may include without limitation a presentation device (e.g., television), a printer, and/or the like.

The computer system 1000 may further include (and/or be in communication with) one or more non-transitory storage devices 1010, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1000 might also include a communications subsystem 1012, which may include without limitation a router, modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1012 may permit data to be exchanged with a network (such as the network described below, to name one example), other computer systems, and/or any other devices described herein. In many embodiments, the computer system 1000 will further comprise a working memory 1014, which may include a random access memory and/or a read-only memory device, as described above.

The computer device 1000 also may comprise software elements, shown as being currently located within the working memory 1014, including an operating system 1016, device drivers, executable libraries, and/or other code, such as one or more application programs 1018, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1010 described above. In some cases, the storage medium might be incorporated within a computer system, such as computer system 1000. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1000) to perform methods in accordance with various embodiments of the disclosure. According to a set of embodiments, some or all of the procedures of such methods are performed by the computer system 1000 in response to processor 1004 executing one or more sequences of one or more instructions (which might be incorporated into the operating system 1016 and/or other code, such as an application program 1018) contained in the working memory 1014. Such instructions may be read into the working memory 1014 from another computer-readable medium, such as one or more of the storage device(s) 1010. Merely by way of example, execution of the sequences of instructions contained in the working memory 1014 may cause the processor(s) 1004 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 1000, various computer-readable media might be involved in providing instructions/code to processor(s) 1004 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1010. Volatile media may include, without limitation, dynamic memory, such as the working memory 1014.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 1004 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1012 (and/or components thereof) generally will receive signals, and the bus 1002 then might carry the signals (and/or the data, instructions, etc. carried by the signals) to the working memory 1014, from which the processor(s) 1004 retrieves and executes the instructions. The instructions received by the working memory 1014 may optionally be stored on a non-transitory storage device 1010 either before or after execution by the processor(s) 1004.

It should further be understood that the components of computer device 1000 can be distributed across a network. For example, some processing may be performed in one location using a first processor while other processing may be performed by another processor remote from the first processor. Other components of computer system 1000 may be similarly distributed. As such, computer device 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device monitor and control system comprising:
   a first device monitor located at a first structure having a first location, wherein the first device monitor is in communication with a first plurality of devices located at the first structure;
   a second device monitor located at a second structure having a second location, wherein:
      the second device monitor is in communication with a second plurality of devices located at the second structure; and
      the second structure is distinct from the first structure;
   a server system, the server system comprising:
      a processing unit comprising one or more processors;
      a network interface configured to receive signals from the first device monitor and the second device monitor; and a memory coupled with and readable by the processing unit and storing therein a set of instructions which, when executed by the processing unit, causes the server system to:
receive a device status detection signal via the network interface from the first device monitor, the device status detection signal including a device identifier of a first device of the first plurality of devices at the first structure and an operational status data for the first device;
determine a first ambient light measurement at the first structure corresponding to the device status detection signal;
determine a time at which an ambient light measurement at the second structure equals the first ambient light measurement;
determine a second device identifier based on the device identifier of the first device, the second device identifier corresponding to a second device of the second plurality of devices located at the second structure;
determine one or more operational settings for the second device, based on the operational status data for the first device; and
transmit a control signal for controlling the second device to the second device monitor at the second structure at the determined time, the control signal including the second device identifier and data corresponding to the operational settings for the second device.

2. The device monitor and control system of claim 1, wherein determining the second device identifier comprises:
accessing a storage containing a device-to-device mapping table; and
using the device identifier of the first device, retrieving the second device identifier from the device-to-device mapping table.

3. The device monitor and control system of claim 1, wherein determining the second device identifier comprises:
determining one or more device characteristics of the first device;
accessing a device characteristic mapping table; and
using the device characteristics of the first device, retrieving the second device identifier from the device characteristic mapping table.

4. The device monitor and control system of claim 1, wherein the second device at the second location comprises one or more of a television, an outdoor speaker system, a fireplace, an irrigation system, a garage door, or a shade controller device.

5. The device monitor and control system of claim 1, wherein the second device comprises a light at the second location, and wherein the operational settings for the second device include a dimmer switch setting for the light at the second location.

6. The device monitor and control system of claim 1, wherein transmitting the control signal comprises:
determining a network address of the second device monitor at the second location; and
transmitting the control signal to the network address of the second device monitor and control system.

7. The device monitor and control system of claim 1, wherein transmitting the control signal comprises:
transmitting the control signal to an intermediary server not located at the first location or at the second location.

8. The device monitor and control system of claim 1, the memory storing further instructions which, when executed by the processing unit, causes the device monitor and control system to:
create a device usage pattern for the first device at the first location, based on a plurality of device status detection signals received over a period of time;
detect at least one of a power outage or a network outage at the first location; and
transmit the control signal during the power outage or a network outage at the first location, wherein the control signal is transmitted at a time determined based on the device usage pattern for the first device.

9. A method, comprising:
receiving, at a device monitor and control system, a device status detection signal, the device status detection signal including a device identifier of a first device located at a first structure at a first location and operational status data for the first device;
determining, at the device monitor and control system, a second device identifier based on the device identifier of the first device, the second device identifier corresponding to a second device at a second structure at a second location;
determining a first ambient light measurement at the first structure corresponding to the device status detection signal;
determining a time at which an ambient light measurement at the second structure equals the first ambient light measurement;
determining, at the device monitor and control system, one or more operational settings for the second device, based on the operational status data for the first device; and
transmitting, at the device monitor and control system, a control signal for controlling the second device at the second location at the determined time, the control signal including the second device identifier and data corresponding to the operational settings for the second device.

10. The method of claim 9, wherein the second device at the second location comprises one or more of a television, an outdoor speaker system, a fireplace, an irrigation system, a garage door, or a shade controller device.

11. The method of claim 9, wherein transmitting the control signal comprises:
determining a network address of a second device monitor and control system at the second location; and
transmitting the control signal to the network address of the second device monitor and control system.

12. The method of claim 9, wherein transmitting the control signal comprises:
transmitting the control signal to an intermediary server not located at the first location or at the second location.

13. The method of claim 9, further comprising:
creating a device usage pattern for the first device at the first location, based on a plurality of device status detection signals received over a period of time;
detecting at least one of a power outage or a network outage at the first location; and
transmitting the control signal during the power outage or a network outage at the first location, wherein the control signal is transmitted at a time determined based on the device usage pattern for the first device.

14. A non-transitory computer-readable memory comprising a set of instructions stored therein which, when executed by a processor, causes the processor to:

receive a device status detection signal, the device status detection signal including a device identifier of a first device at a first structure located at a first location and operational status data for the first device;

determine a second device identifier based on the device identifier of the first device, the second device identifier corresponding to a second device at a second structure located at a second location;

determine one or more operational settings for the second device, based on the operational status data for the first device;

determine a first ambient light measurement at the first structure corresponding to the device status detection signal;

determine a time at which an ambient light measurement at the second structure equals the first ambient light measurement; and transmit a control signal for controlling the second device at the second location at the determined time, the control signal including the second device identifier and data corresponding to the operational settings for the second device.

15. The computer-readable memory of claim 14, comprising further instructions stored therein which, when executed by the processor, causes the processor to:

create a device usage pattern for the first device at the first location, based on a plurality of device status detection signals received over a period of time;

detect at least one of a power outage or a network outage at the first location; and transmit the control signal during the power outage or a network outage at the first location, wherein the control signal is transmitted at a time determined based on the device usage pattern for the first device.

* * * * *